United States Patent [19]

Gilmour

[11] 4,386,145

[45] May 31, 1983

[54] FABRICATION OF ARRAYS CONTAINING INTERLAID PATTERNS OF MICROCELLS

[75] Inventor: Hugh S. A. Gilmour, Rochester, N.Y.

[73] Assignee: Eastman Kodak Company, Rochester, N.Y.

[21] Appl. No.: 375,423

[22] Filed: May 6, 1982

Related U.S. Application Data

[63] Continuation-in-part of Ser. No. 192,976, Oct. 1, 1980, abandoned.

[51] Int. Cl.[3] .......................... G03C 1/76; B32B 3/12; B23K 9/00; B05D 3/06

[52] U.S. Cl. .......................................... 430/7; 430/11; 430/138; 430/155; 430/202; 430/271; 430/322; 430/338; 430/363; 430/365; 430/403; 430/495; 430/496; 430/510; 430/511; 430/517; 430/523; 430/935; 430/945; 427/53.1; 428/117; 428/118; 219/121 L; 219/121 LJ; 219/121 LL; 219/121 LN

[58] Field of Search .................. 430/7, 138, 363, 365, 430/495, 935, 322, 945, 11, 155, 202, 271, 338, 375, 403, 496, 510, 511, 517, 523; 427/53.1, 68, 75, 230, 282; 428/116-118; 156/292; 219/121 L, 121 LG, 121 LH, 121 LJ, 121 LK, 121 LL, 121 LN

[56] References Cited

U.S. PATENT DOCUMENTS 4,352,874 10/1982 Land et al. ......................... 430/496

OTHER PUBLICATIONS

WO80/01614, Pub. 7 Aug. 1980, Eastman Kodak Co.; Whitmore, Keith.

*Primary Examiner*—Mary F. Downey
*Attorney, Agent, or Firm*—Carl O. Thomas

[57] ABSTRACT

In the forming of microcellular arrays, such as those useful in photography, a closure is positioned to overlie a plurality of microcells forming a planar array. The closure is selectively removed from one set of microcells forming an interlaid pattern with a second set of microcells so that the contents of the first set of microcells can be changed without concurrently changing the contents of the second set of microcells.

27 Claims, 11 Drawing Figures

FIG. 1A
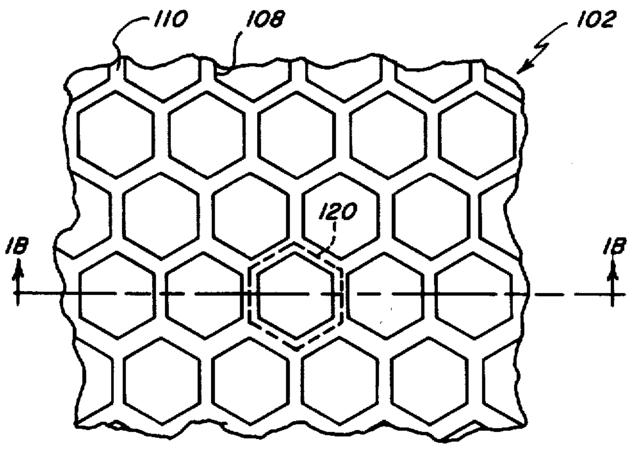
FIG. 1B
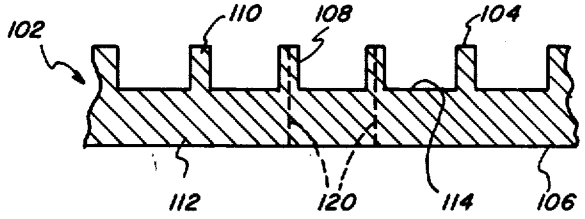
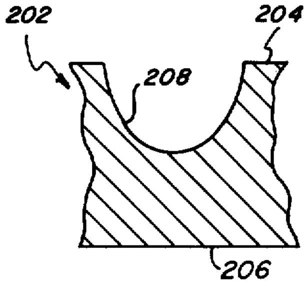
FIG. 2
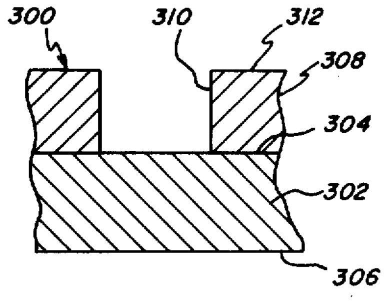
FIG. 3

FIG. 4A
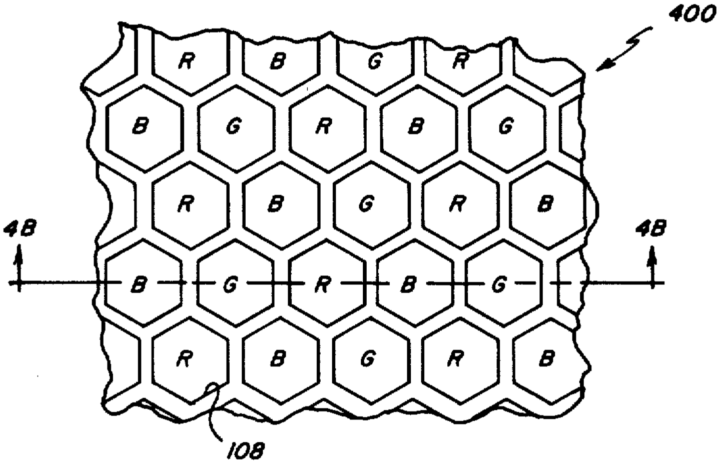
FIG. 4B
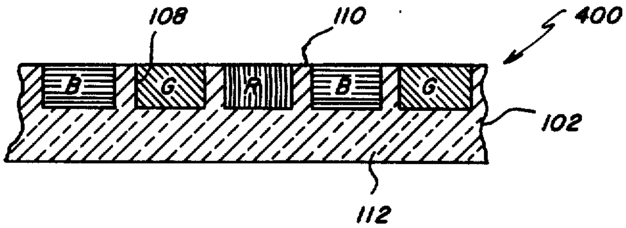
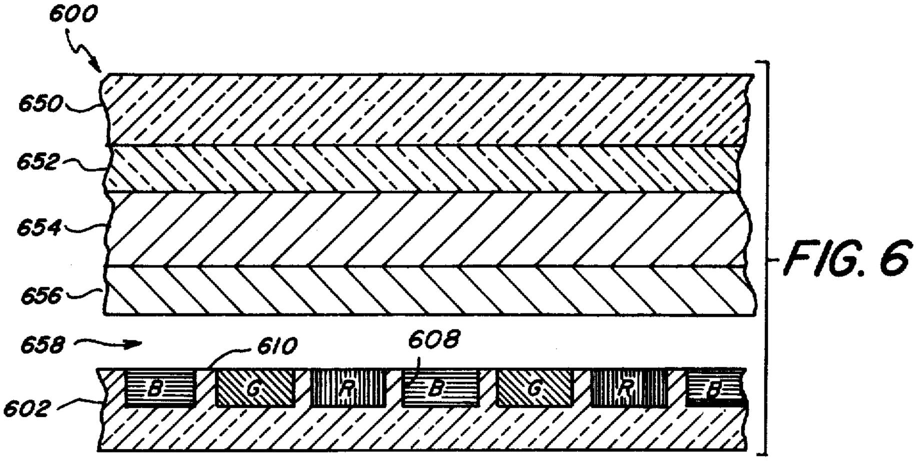
FIG. 6

FABRICATION OF ARRAYS CONTAINING INTERLAID PATTERNS OF MICROCELLS

FIELD OF THE INVENTION

The present invention is directed to a process of separately addressing at least one of two or more interlaid sets of microcells forming an array. The invention is also directed to microcellular elements, including both elements useful in practicing this process and elements which are the products of this process. In a specific aspect this invention relates to photographic elements and processes for their manufacture.

BACKGROUND OF THE INVENTION

This invention is an improvement on K. E. Whitmore U.S. Ser. No. 184,714, filed Sept. 8, 1980, commonly assigned, titled IMAGING WITH NONPLANAR SUPPORT ELEMENTS, which is a continuation-in-part of U.S. Ser. No. 008,819, filed Feb. 2, 1979, now abandoned. Whitmore applies to photographic imaging the use of supports containing arrays of microcells (or microvessels) opening toward one major surface. In a variety of different forms the photographic elements and components disclosed by Whitmore contain an array of microcells in which first, second, and, usually, third sets of microcells are interspersed to form an interlaid pattern. In a typical form three separate sets of microcells, each containing different subtractive primary (i.e., yellow, magenta, or cyan) or additive primary (i.e., blue, green, or red) imaging component, are interlaid. Preferably each microcell of each set is positioned laterally next adjacent at least one microcell of each of the two remaining sets. The microcells are intentionally sized so that they are not readily individually resolved by the human eye, and the interlaid relationship of the microcell sets further aids the eye in fusing the imaging components of the separate sets of microcells into a multicolor image.

In one specifically preferred embodiment disclosed by Whitmore, cyan, magenta, and yellow dyes or dye precursors of alterable mobility are associated with immobile red, green, and blue dyes or pigments, respectively, each present in one of the first, second, and third sets of microcells, and the microcells are overcoated with a panchromatically sensitized silver halide emulsion layer. By exposing the silver halide emulsion layer through the microcells and then developing, an additive primary multicolor negative image can be formed by the microcellular array and the silver halide emulsion layer while cyan, magenta, and yellow dyes can be transferred to a receiver in an inverse relationship to imagewise exposure to form a subtractive primary positive multicolor image. The foregoing is merely exemplary, many other embodiments being disclosed by Whitmore.

A technique disclosed by Whitmore for differentially filling microcells to form an interlaid pattern calls for first filling the microcells of an array with a sublimable material. The individual microcells forming a first set within the array can then be individually addressed with a laser to sublime the material initially occupying the first set of microcells. The emptied microcells can then be filled by any convenient conventional technique with a first imaging component. The process is repeated acting on a second, interlaid set of microcells and filling the second set of emptied microcells with a second imaging component. The process can be repeated again where a third set of interlaid microcells is to be filled, although individual addressing of microcells is not in this instance required. This approach is suggested by Whitmore to be useful in individually placing triads of additive and/or subtractive primary materials in first, second, and third sets of microcells, respectively.

SUMMARY OF THE INVENTION

While the process described by Whitmore for differentially filling microcells in an interlaid pattern is useful, the present invention represents an improvement in several respects. Specifically, the present invention is more efficient in its use of materials. It creates less waste of valuable materials and obviates any necessity of employing sublimable materials. The present process requires less energy to obtain empty sets of microcells. For example, less laser energy is required. Any risk of only partially emptying microcells is reduced. Finally, the present invention offers the capability of initially filling the microcells with one or more nonsublimable materials which are intended to remain permanently in some of the microcells. Other advantages of this invention will become apparent from the detailed description of preferred embodiments.

In one aspect, this invention is directed to an improvement in a process comprising forming in a support having first and second major surfaces a planar array of microcells opening toward the first major surface and selectively altering the contents of a first set of the microcells in relation to a second, interlaid set of the microcells. The process is characterized by the improvement comprising, selectively altering the contents of the microcells by positioning adjacent the first major surface, means for closing both the first and second sets of microcells and selectively removing the closing means from the first set of microcells to permit selectively altering the contents of the first set of microcells without concurrently altering the contents of the second set of microcells.

In another aspect this invention is directed to the combination comprising support means having first and second major surfaces and forming a planar array of microcells opening toward the first major surface and a destructible membrane overlying the first major surface, thereby closing a plurality of the microcells of the planar array.

The invention can be more fully appreciated by the following description of preferred embodiments considered in conjunction with the drawings, in which FIG. 1A is a plan view of a support;

FIG 1B is a section taken along section line 1B in FIG. 1A;

FIGS. 2 and 3 are sectional details of alternate supports;

FIG. 4A is a plan view of a multicolor filter element;

FIG. 4B is a section taken along section line 4B in FIG. 4A;

FIG. 6 is a sectional view of a multicolor image transfer photographic element constructed according to this invention.

Figure 5A:
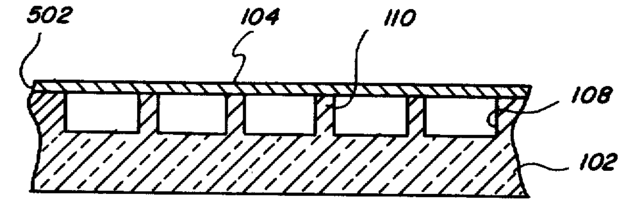
FIGS. 5A through 5D are sectional views showing progressive stages of construction of the multicolor filter element.
Figure 5B:
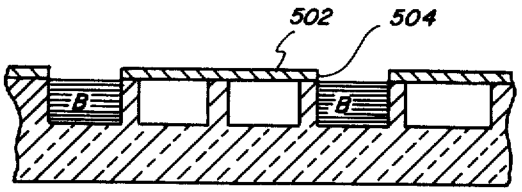

The drawings are of a schematic nature for convenience of viewing. Since the individual microcells are too small to be viewed with the unaided human eye, the microcells and elements in which they are contained are greatly enlarged. The depth of the microcells have also been exaggerated in relation to the thickness of the supports, which typically is from 50 to 500 or more, times greater.

DESCRIPTION OF PREFERRED EMBODIMENTS

A support is employed in the practice of this invention having formed therein an array of microcells. The support and its microcells can be similar to those described by Whitmore, cited above, and here incorporated by reference.

A specific preferred support 102 is schematically illustrated in FIGS. 1A and 1B. The support has substantially parallel first and second major surfaces 104 and 106. The support defines a plurality of microcells (or microvessels) 108, which open toward the first major surface of the support. The microcells are defined in the support by an interconnecting network of lateral walls 110 which are integrally joined to an underlying portion 112 so that the support acts as a barrier between adjacent microcells. The underlying portion of the support defines the bottom wall 114 of each microcell.

The dashed line 120 defines a boundary of an area unit containing a single microcell. The remaining depicted area of the support is formed by area units essentially identical to that within the boundary 120.

Alternative supports employed in the present invention can be varied in their geometrical configuration and structural makeup. For example, FIG. 2 schematically illustrates in section a unit area of a support 202 provided with a first major surface 204 and a second, substantially parallel major surface 206. A microcell 208 opens toward the first major surface. The support is comprised of a plurality of repeated similar unit areas. The microcells are formed so that the support provides inwardly sloping walls which perform the functions of both the lateral and bottom walls of the microcells 108. Such inwardly curving wall structures are more conveniently formed by certain techniques of manufacture, such as etching, and also can be better suited for redirecting exposing radiation toward the interior of the microcells in photographic applications.

In FIG. 3 a unit area of a support 300 is shown. The support is comprised of a first support element 302 having a first major surface 304 and a second substantially parallel major surface 306. Joined to the first support element is a second support element 308 which is provided in each repeated unit area with an aperture 310. The second support element is provided with an outer major surface 312. The walls of the second support element forming the aperture 310 and the first major surface of the first support element together define a microcell. The support is comprised of repetitions of the unit area shown.

The microcells are located in the supports in a predetermined, controlled relationship to each other. The microcells are relatively spaced in a predetermined, ordered manner to form an array. It is usually desirable and most efficient to form the microcells so that they are aligned along at least one axis in the plane of the support surface. For example, microcells in the configuration of hexagons (preferred for arrays containing three interlaid sets of microcells differing in the material contained therein), are conveniently aligned along three support surface axes which intersect at 60° angles. It is generally preferred that the microcells be positioned to form a regular pattern. It is recognized that adjacent microcells can be varied in spacing to permit alterations in visual effects and for other purposes. Although FIG. 1A shows regular hexagonal microcells, any polygonal, circular, elliptical, or other predetermined recurring microcell configuration can be employed, as may be convenient.

As disclosed by Whitmore, the foregoing supports are merely illustrative of a variety of possible configurations. In one variant form the microcells can be of extended depth. In another variant form a relatively deformable support element can be coated on a relatively nondeformable second support element and embossed. In section such a support differs from support 300 in that a thinned portion of the second support element 308 extends beneath the microcells rather than the second support element being apertured, as shown. Hexagonal microcells are preferred for multicolor photographic applications, as described more fully below.

It is also possible to coat any and all of the supports described above to alter their surface properties. For example, one or a combination of thin subbing layers can be coated on one major surface of the supports and extended into the microcells, thereby coating their walls without filling the microcells. Such layers can be used to promote adhesion of materials to be introduced into the microcells, to increase or decrease reflection of radiation, or to perform other modifying functions.

Although one major surface of the supports is shown in each instance to be planar, it can take other configurations. For example, separate arrays of microcells can open toward each major surface of the supports. Depending upon the application, the microcells of those separate arrays can be intentionally aligned, misaligned, or not intentionally oriented with respect to each other. The major surface shown to be planar can alternatively be lenticular. In a preferred exemplary form a single lenticule can be coextensive with the boundary of the area 120.

For photographic applications it is frequently desirable to form elements containing two or three separate interlaid sets of microcells. Three interlaid sets of microcells can, for example, contain interlaid segments of blue, green, and red filters, the blue, green, and red dyes or pigments forming the filters each being confined to a separate set of microcells. Alternatively, the separate sets of microcells can contain radiation-sensitive imaging materials, each sensitive to a different portion of the visible spectrum—e.g., blue, green, and red responsive silver halide emulsions, each confined to a separate set of microcells. In still another form, the three sets of microcells can contain subtractive primary imaging dyes or dye precursors—i.e., cyan, magenta, and yellow imaging dyes or dye precursors, each confined to a separate set of microcells. The microcells can also contain combinations of filter, radiation-sensitive, and imaging materials.

To illustrate a specific application for the microcellular supports, in FIGS. 4A and 4B a multicolor filter element 400 is illustrated. As shown, the filter element is comprised of a support 102 forming a plurality of identical hexagonal microcells 108. The lateral walls 110 separating adjacent microcells are dyed to reduce light transmission therethrough while the underlying portions 112 of the support, which form the bottom walls of the microcells, are substantially transparent. As shown, the multicolor filter element is comprised of red, green, and blue filters, each divided into discrete segments R, G, and B. The filter segments are located in first, second, and third sets of microcells in an interlaid pattern.

The multicolor filter element 400 can be employed for additive multicolor imaging, such as illustrated by Dufay U.K. Pat. No. 15,027 (1912), Dufay U.S. Pat. No. 1,003,720, and James, *The Theory of the Photographic Process*, 4th Ed., Macmillan, 1977, p. 335. By exposing through the multicolor filter a panchromatically responsive imaging material—such as a panchromatically sensitized silver halide emulsion, it is possible to form a multicolor image. For instance, a negative-working silver halide emulsion can produce a multicolor negative image following exposure and development when viewed through the multicolor filter. A direct-positive imaging material will similarly produce a positive multicolor image.

The interlaid pattern of microcells illustrated is particularly advantageous from a visual standpoint, since each filter segment is surrounded by an equal number of segments of each of the two remaining filters. In this way the eye can readily blend the laterally separated filter segments in viewing an image. Also, printing through a multicolor negative image formed by the filters and radiation-sensitive imaging material to form a multicolor positive is facilitated by the spatial relationship of the separate sets of microcells.

It is, of course, recognized that other interlaid patterns of filter segments are possible. For example, instead of being interlaid in the manner shown, the blue, green, and red filter segments can form separate rows of microcells. For instance, a row of filter segments of one color can be interposed between two filter segment rows, one of each of the two remaining additive primary colors. Different interlaid patterns can also occur as a result of devoting unequal numbers of microcells to the different filters. For example, it is recognized that the human eye obtains most of its information from the green portion of the spectrum. Less information is obtained from the red portion of the spectrum, and the least amount of information is obtained from the blue portion of the spectrum. Bayer U.S. Pat. No. 3,971,065 discloses an interlaid additive primary multicolor filter segment pattern in which the green segments occupy half of the total array area, with red and blue filter segments each occupying one half of the remaining area of the filter array. Such filters can be formed by the present invention, if desired.

Dufay and others recognized the desirability of providing segmented interlaid filters in the smallest attainable sizes. Lateral spreading of the materials forming the separate filter segments has, however, posed a limitation on obtaining small filter segments. For example, when dyes from adjacent segments mix, even in edge regions, unwanted shifts in hue can occur. Whitmore, cited above, recognized that lateral spreading can be overcome by placing the filter materials in microcells. The lateral walls 110 of the support 102 form a physical barrier to lateral spreading and mixing of filter materials.

Notwithstanding Whitmore's contribution to the art, the present invention provides an improved approach for selectively introducing materials into interlaid sets of microcells. It is to be recognized that the supports as shown in the drawings are greatly enlarged and contain some deliberate distortions of relative proportions. Most notably, the microcells have been greatly enlarged for purposes of illustration. In actuality the microcells are intentionally formed of a size that cannot be readily resolved by the unaided human eye, and in general the microcells can only be individually viewed microscopically. Thus, the vast majority of approaches for placing materials in interlaid set of larger cells are foreclosed to the placement of materials selectively in interlaid sets of microcells.

The method of the present invention is generally applicable to the formation of elements containing in a first set of microcells a first material or combination of materials and in at least one other, interlaid set of microcells a different material or combination of materials. FIGS. 5A through 5D illustrate the application of the method of this invention to the manufacture of an element containing three interlaid sets of microcells each containing a different material or combination of materials.

In FIG. 5A the support 102 is shown in the form described above for use in the multicolor filter element 400. Adjacent the first major surface 104 of the support is a membrane 502. The membrane overlies and closes the microcells 108 of the support. The membrane is comprised of or entirely formed of a film-forming organic polymer and is thin as compared to the lateral walls 110 of the support. The membrane is preferably of a thickness of from about 5 to 50 percent that of the lateral walls. The microcells preferably initially contain a readily removable thermal insulator, such as air, although any readily removable material could be initially present.

While any convenient conventional technique can be employed for forming the membrane and locating it in the position shown in FIG. 5A, in most instances the membrane will be about 0.2 to 1 micron in thickness so that many approaches useful in forming thicker membranes will not be useful in forming or positioning the membrane 502. In one specific preferred approach the membrane is formed by casting a film-forming polymer in a volatile solvent on the surface of a liquid in which the polymer does not readily dissolve, such as water, contained in a reservoir. The film is allowed to at least partially set by solvent evaporation. To protect the film from disturbances a floating frame can be laid on the film, if desired. By slowly raising the support 102 from within the reservoir to the surface of the water, the membrane can be positioned on the first major surface of the support in the desired position without endangering the integrity of the membrane. Any water initially trapped in the microcells will evaporate if the element is allowed to stand for a period of time. The minimal thickness of the membrane allows both air and water vapor to diffuse therethrough, so that in a period of time an element is produced as shown in FIG. 5A having only air in the microcells. It is appreciated that other volatile or highly thermally nonconductive liquids can be substituted for water in providing a casting surface, if desired. Instead of raising the support through the water, the support can be simply laid on the dry upper surface of the membrane with the first major surface of the support contacting the membrane.

The next step of the process is to selectively open the microcells intended to form one of the interlaid sets. Any technique which allows one set of microcells to be opened selectively can be employed. It is preferred to employ radiation striking the membrane to open the set of microcells. Any of the various techniques disclosed by Whitmore, such as the use of masks, can be employed. According to a preferred technique a laser beam is sequentially aimed at the microcells forming one interlaid set. This is typically done by known laser scanning techniques, such as illustrated by Marcy U.S. Pat. No. 3,732,796, Dillon et al U.S. Pat. No. 3,864,697 and Starkweather et al U.S. published patent application B309,860.

Following a specific, preferred technique two lasers are employed. One of the lasers is of sufficient intensity to provide the desired alteration of the membrane overlying the microcells. The second laser is used only to position accurately the first laser and can differ in wavelength and can be of lesser intensity. The first and second laser beams are laterally displaced in the plane of the membranes by an accurately determined distance. By employing a photodetector to receive light transmitted through or reflected from the support from the second laser, it can be determined when a microcell or a lateral wall is aligned with the second laser beam. In the illustrated preferred form, in which the support bottom walls are substantially transparent and the lateral walls are dyed, a substantial change in light intensity sensed by the photodetector will occur as a function of the relative position of the support and laser beam. In other instances differences in reflection or refraction between the bottom and lateral walls forming the microcells can be relied upon to provide information to the photodetector. Once the position of the second laser with respect to a microcell is ascertained, the position of the first laser with respect to a microcell can also be ascertained, since the spacing between the lasers and the center-to-center spacings of the microcells are known. Depending upon the pattern and accuracy of exposure desired, indexing with the second laser can be undertaken before exposing each microcell with the first laser, only once at the beginning of exposure of one microcell set, or at selected intermediate intervals, such as before each row of microcells of one set is exposed.

When a first laser scan is completed, the support is left with one open microcell set while the remaining interlaid microcell sets are substantially undisturbed. Instead of sequentially laser exposing the microcells in the manner indicated, exposure through a mask can be undertaken, as is well known. Laser scanning exposure offers the advantages of eliminating any need for mask preparation and alignment with respect to the microcells prior to opening one microcell set.

When radiant energy from a laser or other source impinges on the membrane in one or more areas corresponding to one microcell or microcell set, the membrane is locally heated. It is specifically preferred to impinge radiant energy selectively over that portion of the membrane lying at or near the center of the underlying microcell. Since the membrane is extremely thin, its heat capacity is low. That is, very little heat energy is required to raise its temperature. Thus, a laser beam, for example, can quickly raise the temperature of the organic membrane to its decomposition point in a selected area overlying a microcell. Since the membrane is no more than half the thickness of the lateral walls and usually of much less thickness, the lateral walls do not rise in temperature to the same extent as the membrane, even when both the membrane and support are formed of the same material. Being thicker, the lateral walls have a higher heat capacity, slowing their increase in temperature. Second, if the radiant energy is confined to the area near the center of the underlying microcell, heat must be conducted laterally by the membrane to the lateral walls; but being very thin, the membrane is an inefficient thermal conductor. Selective thermal destruction of the membrane can be enhanced by forming the support of a more thermally stable material, so that if the membrane and support should approach the same temperature, the membrane will still be selectively destroyed.

It is specifically contemplated to employ a radiant energy source and membrane in combination which allows the membrane to absorb efficiently the radiant energy. The film-forming polymer composition can be modified by incorporating an ultraviolet absorber, dye, or infrared absorber. Independently, an absorption promoting material can be coated over the membrane once it is formed in place. For example, the membrane can receive a deposit of lamp black by being passed over an open flame to increase its absorption of radiant energy. In addition to increasing the radiant energy absorption by the membrane, the support can be chosen so that it is relatively nonabsorbing in the spectral region of the radiant energy.

From the foregoing it is apparent that, by selectively addressing areas of the membrane overlying one set of microcells, it is possible to open selectively one set of microcells without affecting adjacent sets of microcells and without damaging the support. Thereafter, the opened set of microcells can be filled by any convenient conventional technique without filling the remaining microcells. This is illustrated by reference to FIG. 5B, in which the membrane 502 has been modified by the introduction of apertures 504 corresponding to one underlying set of microcells. For purposes of illustration, the open set of microcells is shown to be filled with material forming the blue filter segments B.

In filling the open set of microcells, a technique is preferably chosen which places minimal physical stress on the membrane. For example, in the form illustrated, an aqueous solution of blue dye or suspension of blue pigment can be introduced into the open set of microcells while placing only minimal stress on the remaining membrane. Upon evaporation of water, the blue dye or pigment is left in the open set of microcells. Filling can be repeated, if desired, until the desired optical density of blue dye or pigment is obtained in the open microcells. This approach can be practiced with any material or combination of materials desired to be placed in the microcells and any compatible volatile liquid. By proper choices of materials and liquids layering can be achieved within the microcells, if desired. In an alternative form the filling material can take the form of a fine particulate which is gently brushed into the microcells. The particles, of course, have mean diameters substantially less than the width of the microcells. The particles can, if desired, be fused in place. For example, many particulate materials will fuse simply by standing under conditions of high humidity. Fusion by mild heating is also contemplated.

Figure 5C:
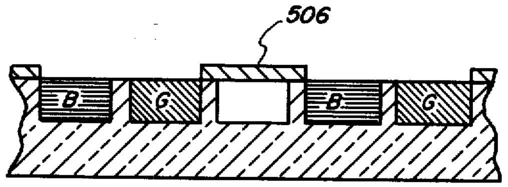

In FIG. 5C a second, interlaid set of microcells is shown opened and filled to form green filter segments G. The techniques described above for opening and filling the first set of microcells can be repeated unchanged, except for the substitution of green filter material. When this stage of the process is reached, only discrete segments 506 of the original membrane remain overlying the third, interlaid set of microcells.

Figure 5D:
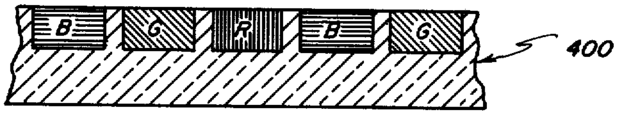

To permit the third, interlaid set of microcells to be filled, the techniques described above for opening the first and second sets of microcells can be repeated, except that a red filter material is substituted. The product, as shown in FIG. 5D, is the multicolor filter element 400.

It will be apparent that the last set of microcells can be filled by a broader selection of techniques than the first and any intermediate sets of microcells. In opening the last set of microcells the techniques employed for removing the membrane need not be areally selective. For example, in the specific embodiment illustrated, since the membrane can be entirely destroyed in opening the last set of microcells, it is not necessary to address the membrane segments 506 selectively with radiant energy. Rather, the element as shown in FIG. 5C can be uniformly exposed to radiant energy to destroy the membrane segments 506. Alternatively, the membrane segments remaining can be removed by laminating it to a support to which it adheres in preference to the first major surface 104 and then simply lifting the membrane segments from the first major surface. Adhesion of the membrane segments to another support can be accomplished by any one of a wide variety of conventional laminant transfer techniques.

It is not even necessary to remove the membrane segments 506 before filling. By employing filling techniques which are in themselves capable of destroying the membrane segments, the steps of opening and filling the last set of microcells can be combined. For example, by doctor blade coating the element as shown in FIG. 5C with a red filter material, the membrane segments can be collapsed into the underlying microcells while leaving room for the red filter material to also enter the third set of microcells.

The foregoing microcell filling technique is particularly well suited to applications in which the microcells of each set, except the last, are intended to be substantially entirely filled. Thus, any material intended to be placed in a subsequent set of microcells after the first set has been opened and filled cannot enter the first set of microcells, since material filling these microcells prevents additional material from entering. Any slight amount of material that may deposit above the first, filled set of microcells in filling the second or subsequent sets can in many applications be ignored. Alternatively, the additional surface material can be removed by gently abrading the first major surface 104 of the support after all of the microcells have been filled. For example, the major surface 104 of the support can be swabbed or skived with a doctor blade to remove any materials over and above those which are contained in the microcells.

In a variant approach, which is particularly applicable to only partially filling the microcells or maintaining a high degree of separation of materials being placed in separate sets of microcells, after the first set of microcells are opened and partially filled to the extent desired, a second membrane is positioned over the first major surface of the support. If desired, the first membrane can be entirely removed before positioning the second membrane, as by using the laminant or destruction techniques described above. Where the membranes are comparatively thin, so that the multiple layers of membrane can still be thermally destroyed selectively without damaging the support lateral walls, the second membrane can be positioned over the first, now apertured, membrane. The first and second membranes are then selectively destroyed in areas overlying the second set of microcells, so that these microcells can be at least partially filled through the resulting apertures. Placement of the third membrane, if employed, follows the same techniques and considerations as for the first and second membranes. It is usually preferred that the last set of microcells be opened by the overlying membrane or membranes being selectively addressed, thereby preserving the closure of the sets of microcells previously at least partially filled. Depending upon the desired application, any membrane(s) remaining after the last set of microcells have been selectively filled to the extent desired can either be left in place, destroyed, or transferred to a separate support, as has been described above.

In an alternative to the processes of differentially filling microcells in interlaid sets described above, it is contemplated to place in all of the microcells prior to closure by a membrane at least one material that permanently remains in at least one interlaid set of microcells. The membrane closing the microcells is removed by any of the specific techniques described above in all areas, except those corresponding to the set of microcells in which initially present material is intended to remain. Initially present material is then removed from the opened microcells. For example, a soluble material can be removed merely by bringing the element into contact with a solvent, as by spraying with or immersion in the solvent. Once at least one set of microcells have been emptied, a second material or combination of materials is placed in the emptied set of microcells.

The general procedure described above can be illustrated by reference to forming the multicolor filter element 400. A removable blue filter material, such as a blue filter dye that can be solubilized is initially introduced into microcells 108 of the support 102. The microcells are then closed with a membrane 502 so that the element appears similar to that of FIG. 5A, but with the microcells each containing blue filter material. Thereafter, the interlaid second and third sets of microcells intended to contain green and red filter materials, respectively, are opened by using any of the selective membrane removal techniques described above. Membrane segments similar to 506 now overlie only the microcells in which the filter material is to be retained. The element can be contacted with a solvent for the blue filter material, permitting it to be removed from the open second and third sets of microcells. The second and third sets of microcells can be now at least partially filled with a green filter material which can be solubilized, and the second and third sets of microcells are closed with a second membrane. The segments of the first membrane can be first removed or, preferably, left in place, since they do not affect the process. Using an essentially repetitive procedure, the portions of the second membrane overlying the third set of microcells is selectively removed, and the green filter material is removed from the third set of microcells. The second membrane remains intact closing the first and second sets of microcells, and the blue and green filter materials remain in place in these microcells. Red filter material can now be introduced into the third set of microcells.

It is to be noted that, since the membranes protect the microcells containing the material desired to be retained, the green and blue microcells can be entirely or only partially filled with material without any variation in the process. It is immaterial whether the red filter material can be solubilized or whether the red filter material entirely or partially fills the third set of microcells, since this has no effect on the process steps. Once the third set of microcells are filled to the extent desired, any portion of the membrane left in place can be removed, if desired, depending upon the intended application for the element. Since air is an exceptionally good thermal insulator, it is preferred that the microcells be only partially filled with the blue and green filter materials to leave an air gap in the microcells separating the filter materials from the membranes; however, if the filter materials are good thermal insulators, the increase in laser energy required in addressing entirely filled microcells can be tolerated.

In using the multicolor filter element 400 described above a panchromatic imaging material can be employed as a continuous layer coated on a separate support and form no part of the filter element, simply being juxtaposed with the filter element during exposure and viewing. In another form, the panchromatic imaging material can form a separate continuous layer coated over the first major surface of the support. In still another variant form, the panchromatic imaging material can lie in each of the microcells so that the filter materials lie between the imaging material and an exposed radiation source. In a specific preferred form a mordant is positioned on the bottom walls of the microcells, and the filter materials are dyes immobilized by the mordant and thereby positioned adjacent the bottom walls of the microcells. The imaging material can be blended with the filter material. Where the imaging material is blended with the filter material, it is preferred to incorporate a selectively blue responsive imaging material in the microcells containing blue filter material, a selectively green responsive imaging material in the microcells containing green filter material, and a selectively red responsive imaging material in the microcells containing red filter material. The three imaging materials can be introduced along with the filter materials as described above, except that the imaging materials should be protected against inadvertent exposure to actinic radiation.

The use of subtractive primary dyes or dye precursors in interlaid sets of microcells can be appreciated by reference to FIG. 6. A multicolor image transfer photographic element 600 is shown. The transparent support 602, the microcells 608, and the lateral walls 610 can be identical to corresponding features in element 400, described above. The microcells contain filter materials and radiation-sensitive imaging materials as described above. In addition each of the microcells is provided with a subtractive primary dye precursor which can be shifted between a mobile and an immobile form either in its dye or dye precursor form. The microcells R, the microcells G, and the microcells B are provided with mobile cyan, magenta, and yellow dye precursors, respectively. The support 602 together with the contents of the microcells form an image generating portion of the photographic element. For purposes of illustration, the photographic element is hereinafter described in terms of a preferred embodiment in which a red responsive silver halide emulsion is present in microcells R, a green responsive silver halide emulsion is present in microcells G, and a blue responsive silver halide emulsion is present in microcells B, each emulsion being blended with an additive primary filter material and a complementary subtractive primary dye precursor.

An image-receiving portion of the photographic element is comprised of a transparent support (or cover sheet) 650 on which is coated a conventional dye immobilizing layer 652. A reflection and spacing layer 654, which is preferably white, is coated over the immobilizing layer. A silver reception layer 656, which contains a silver precipitating agent, overlies the reflection and spacing layer.

In a preferred, integral construction of the photographic element the image-generating and image-receiving portions are joined along their edges and lie in face-to-face relationship. After imagewise exposure a processing solution is released from a rupturable pod, not shown, integrally joined to the image-generating and receiving portions along one edge thereof. A space 658 is indicated between the image-generating and receiving portions to indicate the location of the processing solution when present after exposure. The processing solution contains a silver halide solvent. A silver halide developing agent is contained in either the processing solution or in a position contacted by the processing solution upon its release from the rupturable pod. The developing agent or agents can be incorporated in the silver halide emulsions.

The photographic element 600 is preferably a positive-working image transfer system and is described by reference to such a system. In such a system the silver halide emulsions are preferably negative-working and the dye precursors are positive-working, although direct-positive emulsions and negative-working dye precursors also produce a positive-working image transfer system.

The photographic element 600 is imagewise exposed through the transparent support 602. The red, green and blue filters do not interfere with imagewise exposure, since they absorb in each instance primarily only outside that portion of the spectrum to which the emulsion with which they are associated is sensitized. The filters can, however, perform a useful function in protecting the emulsions from exposure outside the intended portion of the spectrum. For instance, where the emulsions exhibit substantial native blue sensitivity, the red and green filters can be relied upon to absorb light so that the red- and green-sensitized emulsions are not imaged by blue light.

Upon release of processing solution between the image-forming and receiving portions of the element, silver halide development is initiated in the microcells containing exposed silver halide. Silver halide development within a microcell results in one exemplary form in a selective immobilization of the initially mobile dye precursor present. In a preferred form the dye precursor is both immobilized and converted to a subtractive primary dye of a hue complementary to the filter. The residual mobile imaging dye precursor, either in the form of a dye or a precursor, migrates through the silver reception layer 656 and the reflection and spacing layer 654 to the dye immobilizing layer 652. In passing through the silver reception and spacing layers the mobile subtractive primary dyes or precursors are free to and do spread laterally. Referring to FIG. 4A, it can be seen that each microcell containing a selected subtractive primary dye precursor is surrounded by microcells containing precursors of the remaining two subtractive primary dyes. It can thus be seen that lateral spreading results in overlapping transferred dye areas in the dye immobilizing layer of the receiver when mobile dye or precursor is being transferred from adjacent microcells. Where three subtractive primary dyes overlap in the receiver, black image areas are formed, and where no dye is present, white areas are viewed due to the reflection from the spacing layer. Where two of the subtractive primary dyes overlap at the receiver an additive primary image area is produced. Thus, it can be seen that a positive multicolor dye image can be formed which can be viewed through the transparent support 650. The positive multicolor transferred dye image so viewed is right-reading.

In the multicolor photographic element 600 the risk of undesirable interimage effects attributable to wandering oxidized developing agent is substantially reduced, as compared to conventional multicolor photographic elements having superimposed color-forming layer units since the lateral walls of the support element prevent direct lateral migration between adjacent reaction microcells. Nevertheless, the oxidized developing agent in some systems can be mobile and can migrate with the mobile dye or dye precursor toward the receiver to migrate back to an adjacent microcell. To minimize unwanted dye or dye precursor immobilization prior to its transfer to the mordant layer of the receiver it is preferred to incorporate in the silver reception layer 656 a conventional oxidized developing agent scavenger.

Since the processing solution contains silver halide solvent, the residual silver halide not developed in the microcells is solubilized and allowed to diffuse to the adjacent silver reception layer. The dissolved silver is physically developed in the silver reception layer. Solubilization and transfer of the silver halide from the microcells operates to limit direct or chemical development of silver halide occurring therein. It is well recognized by those skilled in the art that extended contact between silver halide and a developing agent under development conditions (e.g., at an alkaline pH) can result in an increase in fog levels. By solubilizing and transferring the silver halide a mechanism is provided for terminating silver halide development in the microcells. In this way production of oxidized developing agent is terminated and immobilization of dye in the microcells is also terminated. Thus, a very simple mechanism is provided for terminating silver halide development and dye immobilization.

In addition to obtaining a viewable transferred multicolor positive dye image a useful negative multicolor dye image is obtained. In microcells where silver halide development has occurred an immobilized subtractive primary dye is present. This immobilized imaging dye together with the additive primary filter offers a substantial absorption throughout the visible spectrum, thereby providing a high neutral density to these microcells. For example, where an immobilized cyan dye is formed in a microcell also containing a red filter, it is apparent that the cyan dye absorbs red light while the red filter absorbs in the blue and the green regions of the spectrum. The developed silver present in the microcell also increases the neutral density. In microcells in which silver halide development has not occurred, the mobile dye precursor, either before or after conversion to a dye, has migrated to the receiver. The sole color present then is that provided by the filter. It is a distinct advantage in reducing minimum density to employ the silver reception layer 656 to terminate silver halide development as described above rather than to rely on other development termination alternatives. If the image-generating portion of the photographic element 600 is separated from the image-receiving portion, it is apparent that the image-generating portion forms in itself an additive primary multicolor negative of the exposure image. The additive primary negative image can be used for either transmission or reflection printing to form right-reading multicolor positive images, such an enlargements, prints and transparencies, by conventional photographic techniques.

The foregoing description of photographic element 600 illustrates the use of initially mobile subtractive primary dye precursors in addition to additive primary filter materials and red, green, and blue responsive silver halide emulsions in interlaid sets of microcells. In alternative multicolor image transfer photographic elements the microcells can contain the silver halide precipitating agent in the microcells and a single panchromatically sensitized silver halide emulsion can be coated to overlie the other contents of the microcells, either in or above the microcells. The subtractive primary dye precursors can either be initially mobile or immobile. Further, either mobile or immobile subtractive primary dyes capable of undergoing imagewise alterations in mobility can be substituted for the dye precursors. In this instance it is preferred to locate the subtractive primary dyes in the microcells so that exposing radiation strikes the silver halide before the dye, thereby avoiding competing absorption and any resulting decrease in speed. In still another variant form preformed image dyes can be shifted in hue so that they do not compete with silver halide in absorbing light to which silver halide in the same microcell is responsive. The dyes can shift back to their desired image hue upon contact with processing solution. If no additive multicolor retained image is desired, the additive primary filter materials can be omitted from the microcells in those instances where the silver halide in each set of microcells is responsive to only one of the blue, green, and red portions of the spectrum. If no transferred multicolor dye image is desired, the layer 656 can be substituted for the layer 652 so that a transferred silver image can be viewed while all subtractive primary dyes or dye precursors can be omitted. Of course, if no transferred dye or silver image is desired, the entire image receiving portion of the photographic element as well as the subtractive primary dye or dye precursor can be omitted. It is therefore apparent that a wide variety of different materials can be employed to form interlaid sets of microcells useful in even a specific application, such as multicolor photography. Specific illustrations of preferred multicolor image transfer systems that can be formed according to the present invention are set forth below.

In one specific, illustrative form the photographic element 600 can contain (1) in a first set of microcells a blue filter dye or pigment and an initially colorless, mobile yellow dye-forming coupler, (2) in a second, interlaid set of microcells, a green filter dye or pigment and an initially colorless, mobile magenta dye-forming coupler and (3) in a third, interlaid set of microcells a red filter dye or pigment and an initially colorless, mobile cyan dye-forming coupler. In a preferred form a panchromatically sensitized negative-working silver halide emulsion (not shown in FIG. 6) is coated over the microcells. The layer 656 contains a silver precipitating agent and an oxidized developing agent scavenger. The reflection and spacing layer 654 can be a conventional titanium oxide pigment containing layer. The dye immobilizing layer 652 contains a substantially immobile oxidizing agent.

The photographic element 600 so constituted is first exposed imagewise through the transparent support 602. Thereafter a processing composition containing a color developing agent and a silver halide solvent is released and uniformly spread in the space 658. In exposed areas silver halide is developed producing oxidized color developing agent which couples with the dye forming coupler present to form an immobile dye. The filter dye or pigment, the immobile dye formed, and the developed silver thus together increase the optical density of the microcells which are exposed.

In areas not exposed, the undeveloped silver halide is solubilized by the silver halide solvent and migrates to the layer 656 where it is reduced to silver. Any oxidized developing agent produced in reducing the silver halide to silver immediately cross-oxidizes with the oxidized developing agent scavenger which is present with the silver precipitating agent in the layer 656.

At the same time mobile coupler is wandering from microcells which were not exposed. The mobile coupler does not react with oxidized color developing agent in the layer 656, since any oxidized color developing agent present preferentially reacts with the scavenger. The coupler thus migrates through layer 656 unaffected and enters reflection and spreading layer 654. Because of the thickness of this layer, the mobile coupler is free to wander laterally to some extent. Upon reaching the immobilizing layer 652, the coupler reacts with oxidized color developing agent. The oxidized color developing agent is produced uniformly in this layer by interaction of oxidizing agent with the color developing agent. Due to lateral diffusion in the spreading layer, superimposed immobile yellow, magenta, and cyan dye images are formed in the immobilizing layer and can be viewed as a multicolor image through the transparent support (or cover sheet) 650 with the layer 654 providing a white reflective background. At the same time, since only filter dye or pigment remains in the unexposed microcells, a useable additive primary negative transparency is formed by the support 602.

To illustrate a variant system, a photographic element as described immediately above can be modified by substituting for the initially colorless, mobile dye forming couplers initially mobile dye developers. The dye developers are shifted in hue, so that the dye developer present in the microcells containing red, green, and blue filters do not initially absorb light in the red, green, and blue regions of the spectrum, respectively. A dye mordant as well as an oxidant can be present in the dye immobilizing layer 652. Since the dye image forming material is itself a silver halide developing agent, a conventional activator solution can be employed (preferably containing an electron transfer agent). The remaining features can be identical to those described in the preceding embodiment.

Upon imagewise exposure and release of the activator solution, dye developer reacts with exposed silver halide to form an immobile subtractive primary dye which is a complement of the additive primary filter material in the exposed microcell. Thus the optical density of exposed microcells is increased, and a negative multicolor additive primary image can be formed in the support 602 by the filter materials. Silver halide development is terminated by transfer of solubilized silver halide as has already been described. In unexposed areas unoxidized dye developer migrates to the immobilizing layer 652 where it is immobilized to form a multicolor positive image. During processing the dye developers shift in hue so that they form subtractive primaries complementary in hue to the additive primary filter materials with which they are initially associated in the microcells. That is, the red, green and blue filter material containing microcells contain dye developers which ultimately form cyan, magenta and yellow image dyes. Hue shifts can be brought about by the higher pH of processing, mordanting or by associating the image dye in the receiver with a chelating material.

Instead of using shifted dye developers as described above, initially mobile leuco dyes can be employed in combination with electron transfer agents to produce essentially similar results. Since the leuco dyes are initially colorless, hue shifting does not have to be undertaken to avoid competing light absorption during imagewise exposure. The leuco dyes are converted to subtractive primary imaging dyes upon oxidation in the dye immobilizing layer.

Instead of employing initially mobile dyes or dye precursors as described above, it is possible to employ initially immobile materials. In one specific preferred form benzisoxazolone precursors of hydroxylamine dye-releasing compounds are employed. Upon cross-oxidation in the microcells with oxidized electron transfer agent produced by development of exposed silver halide, release of mobile dye is prevented. In areas in which silver halide is not exposed and no oxidized electron transfer agent is produced mobile dye release occurs. The dye image providing compounds are preferably initially shifted in hue to avoid competing absorption during imagewise exposure. Mordant immobilizes the dyes in the layer 652. No oxidant is required in this layer in this embodiment. Except as indicated, this element and its function is similar to the illustrative embodiments described above.

Each of the illustrative embodiments described above employ positive-working dye image providing compounds. To illustrate a specific embodiment employing negative-working dye image providing compounds, a first set of microcells 608 can contain a blue filter dye or pigment, a silver precipitating agent and a redox dye-releaser containing a yellow dye which is shifted in hue to avoid adsorption in the blue region of the spectrum prior to processing. In like manner a second, interlaid set of microcells contain a green filter dye or pigment, the silver precipitating agent and a redox dye-releaser containing a analogously shifted magenta dye, and a third, interlaid set of microcells containing a red filter dye or pigment, the silver precipitating agent, and a redox dye-releaser containing an analogously shifted cyan dye. The microcells are overcoated with a panchromatically sensitized silver halide emulsion layer containing an oxidized developing agent scavenger (not shown in FIG. 6). The silver precipitating layer 656 shown in FIG. 6 is not present. The reflection and spreading layer is a white titanium oxide pigment layer. The dye immobilizing layer 652 contains a mordant.

The photographic element is imagewise exposed through the transparent support 602. A processing solution containing an electron transfer agent and a silver halide solvent is spread between the image generating and the image receiving portions of the element. In a preferred form the pH of the processing solution causes the redox dye-releasers to shift to their desired image-forming hues. In areas in which silver halide is exposed oxidized electron transfer agent produced by development of exposed silver halide immediately cross-oxidizes with the scavenger. Thus, in microcells corresponding to exposed silver halide the redox dye-releasers remain unaltered in their initially immobile form. In areas in which silver halide is not exposed, silver halide solvent present in the processing solution solubilizes silver halide allowing it to form soluble silver ion complexes (e.g., $AgS_2O_3^-$) capable of wandering into the underlying microcells. In the microcells physical development of solubilized silver halide occurs producing silver and oxidized electron transfer agent. The oxidized electron transfer agent interacts with the redox dye-releaser to release mobile dye which is transferred to the layer 652 and immobilized by the mordant. A multicolor positive transferred image is produced in the layer 652 comprised of yellow, magenta, and cyan transferred dyes. A multicolor positive retained image can also be produced, since (1) the silver density produced by chemical development in the emulsion layer is small compared to the silver density produced by physical development in the microcells and (2) with the image generating portion separated from the image receiving portion the redox dye-releasers remaining in their initial, immobile condition in the microcells can be uniformly reacted with an oxidizing agent to release mobile dye which can be removed from the microcells by washing.

One function of the microcells when provided in photographic elements is to limit lateral image spreading. The degree to which it is desirable to limit lateral image spreading will depend upon the photographic application. Where a photographic image is to be viewed without enlargement and minimal visible graininess is desired, microcells having widths within the range of from about 1 to 200 microns, preferably from about 4 to 100 microns, are contemplated for use in the practice of this invention. To the extent that visible graininess can be tolerated for specific photographic applications, the microcells can be still larger in width. Where the photographic images produced are intended for enlargement, microcell widths in the lower portion of the width ranges are preferred. It is accordingly preferred that the microcells be about 20 microns or less in width where enlargements are to be made of the images produced by microcellular imaging. Where the microcells of the support are intended to be filled with a radiation-sensitive material to perform an imaging function, the lower limit on the size of the microcells is a function of the photographic speed desired. As the areal extent of the microcells is decreased, the probability of an imaging amount of radiation striking a particular microcell on exposure is reduced. Microcell widths of at least about 7 microns, preferably at least 8 microns, optimally at least 10 microns, are contemplated where the microcells contain radiation-sensitive materials of camera speed. At widths below 7 microns, silver halide emulsions in the microcells can be expected to show significant reductions in speed.

The microcells can be of any necessary depth to contain the materials intended to be placed therein. It is generally preferred that the microcells be sized to that they are entirely filled, although in some forms of the invention partial filling of the microcells is contemplated. In terms of actual dimensions, the depth of the microcells is chosen as a function of the materials to be placed therein. For example, in photographic applications the depth of the microcells is chosen to permit the material contained therein to provide a desired optical density. The depths of the microcells can be less than, equal to, or greater than their width. For photographic applications the depth of the microcells is typically chosen to correspond to the thickness to which the same materials are coated on planar supports. It is generally contemplated that the depth of the microcells will fall within the range of from about 1 to 1000 microns. For silver halide emulsions, dyes, and dye image forming components commonly employed in conjunction with silver halide emulsions, it is generally preferred that the microcells be in the range of from 5 to 20 microns in depth.

The spacing between microcells can be varied, depending upon the application and the effect intended. It is generally preferred for the practice of this invention that the microcells be laterally spaced from about 0.5 to 5 microns, although both greater and less spacings are contemplated. The microcells for photographic applications occupy at least 50 percent (preferably 80 percent) of the array area. The microcells can, when closely spaced, occupy as much as 99 percent of the array area, but more typically in the practice of this invention occupy no more than 90 percent of the array area.

The supports can be formed of the same types of materials employed in forming conventional photographic supports. Typical photographic supports include polymeric film, and wood fiber—e.g., paper supporting elements provided with one or more subbing layers to enhance the adhesive, antistatic, dimensional, abrasive, hardness, frictional, antihalation and/or other properties of the support surface.

Typical of useful polymeric film supports are films of cellulose nitrate and cellulose esters such as cellulose triacetate and diacetate, polystyrene, polyamides, homo- and co-polymers of vinyl chloride, poly(vinyl acetal), polycarbonate, homo- and co-polymers of olefins, such as polyethylene and polypropylene, and polyesters of dibasic aromatic carboxylic acids with divalent alcohols, such as poly(ethylene terephthalate).

Typical of useful paper supports are those which are partially acetylated or coated with baryta and/or a polyolefin, particularly a polymer of an $\alpha$-olefin containing 2 to 10 carbon atoms, such as polyethylene, polypropylene, copolymers of ethylene and propylene and the like.

Polyolefins, such as polyethylene, polypropylene and polyallomers—e.g., copolymers of ethylene with propylene, as illustrated by Hagemeyer et al U.S. Pat. No. 3,478,128, are preferably employed as resin coatings over paper, as illustrated by Crawford et al U.S. Pat. No. 3,411,908 and Joseph et al U.S. Pat. No. 3,630,740, over polystyrene and polyester film supports, as illustrated by Crawford et al U.S. Pat. No. 3,630,742, or can be employed as unitary flexible reflection supports, as illustrated by Venor et al U.S. Pat. No. 3,973,963.

Preferred cellulose ester supports are cellulose triacetate supports, as illustrated by Fordyce et al U.S. Pat. Nos. 2,492,977, '978 and 2,739,069, as well as mixed cellulose ester supports, such as cellulose acetate propionate and cellulose acetate butyrate, as illustrated by Fordyce et al U.S. Pat. No. 2,739,070.

Preferred polyester film supports are comprised of linear polyester, such as illustrated by Alles et al U.S. Pat. No. 2,627,088, Wellman U.S. Pat. No. 2,720,503, Alles U.S. Pat. No. 2,779,684 and Kibler et al U.S. Pat. No. 2,901,466. Polyester films can be formed by varied techniques, as illustrated by Alles, cited above, Czerkas et al U.S. Pat. No. 3,663,683 and Williams et al U.S. Pat. No. 3,504,075, and modified for use as photographic film supports, as illustrated by Van Stappen U.S. Pat. No. 3,227,576, Nadeau et al U.S. Pat. No. 3,501,301, Reedy et al U.S. Pat. No. 3,589,905, Babbitt et al U.S. Pat. No. 3,850,640, Bailey et al U.S. Pat. No. 3,888,678, Hunter U.S. Pat. No. 3,904,420 and Mallinson et al U.S. Pat. No. 3,928,697.

Supports which are resistant to dimensional change at elevated tempertures can be formed. Such supports can be comprised of linear condensation polymers which have glass transition temperatures above about 190° C., preferably 220° C., such as polycarbonates, polycarboxylic esters, polyamides, polysulfonamides, polyethers, polyimides, polysulfonates and copolymer variants, as illustrated by Hamb U.S. Pat. Nos. 3,634,089 and 3,772,405; Hamb et al U.S. Pat. Nos. 3,725,070 and 3,793,249; Gottermeier U.S. Pat. Nos. 4,076,532; Wilson *Research Disclosure,* Vol. 118, February 1974, Item 11833, and Vol. 120, April 1974, Item 12046; Conklin et al *Research Disclosure,* Vol. 120, April 1974, Item 12012; *Product Licensing Index,* Vol. 92, December 1971, Items 9205 and 9207; *Research Disclosure,* Vol. 101, September 1972, Items 10119 and 10148; *Research Disclosure,* Vol. 106, February 1973, Item 10613; *Research Disclosure,* Vol. 117, January 1974, Item 11709, and *Research Disclosure, Vol.* 134, June 1975, Item 13455. *Research Disclosure* is published by Industrial Opportunities Ltd., Homewell, Havant Hampshire, P09 1EF, UK.

The second support elements which define the lateral walls of the microcells can be selected from a variety of materials lacking sufficient structural strength to be employed alone as supports. It is specifically contemplated that the second support elements can be formed using conventional photopolymerizable or photocrosslinkable materials—e.g., photoresists. Exemplary conventional photoresists are disclosed by Arcesi et al U.S. Pat. Nos. 3,640,722 and 3,748,132, Reynolds et al U.S. Pat. Nos. 3,696,072 and 3,748,131, Jenkins et al U.S. Pat. Nos. 3,699,025 and '026, Borden U.S. Pat. No. 3,737,319, Noonan et al U.S. Pat. No. 3,748,133, Wadsworth et al U.S. Pat. No. 3,779,989, DeBoer U.S. Pat. No. 3,782,938, and Wilson U.S. Pat. No. 4,052,367. Still other useful photopolymerizable and photocrosslinkable materials are disclosed by Kosar, *Light-Sensitive Systems: Chemistry and Application of Nonsilver Halide Photographic Processes,* Chapters 4 and 5, John Wiley and Sons, 1965. It is also contemplated that the second support elements can be formed using radiation-responsive colloid compositions, such as dichromated colloids—e.g., dichromated gelatin, as illustrated by Chapter 2, Kosar, cited above. The second support elements can also be formed using silver halide emulsions and processing in the presence of transition metal ion complexes, as illustrated by Bissonette U.S. Pat. No. 3,856,524 and McGuckin U.S. Pat. No. 3,862,855. The advantage of using radiation-sensitive materials to form the second support elements is that the lateral walls and microcells can be simultaneously defined by patterned exposure. Once formed the second support elements are not themselves further responsive to exposing radiation.

It is contemplated that the second support elements can alternatively be formed of materials commonly employed as vehicles and/or binders in radiation-sensitive materials. The advantage of using vehicle or binder materials is their known compatibility with radiation-sensitive materials that may be used to fill the microcells. The binders and/or vehicles can be polymerized or hardened to a somewhat higher degree than when employed in radiation-sensitive materials to insure dimensional integrity of the lateral walls which they form. Illustrative of specific binder and vehicle materials are those employed in silver halide emulsions, typically gelatin, gelatin derivatives, and other hydrophilic colloids. Specific binders and vehicles are disclosed in *Research Disclosure,* Vol. 1786, December 1978, Item 17643.

The light transmission, absorption and reflection qualities of the supports can be varied for different applications. The supports can be substantially transparent or reflective, preferably white, as are the majority of conventional photographic supports. The supports can be reflective, such as by mirroring the microcell walls. The supports can in some applications contain dyes or pigments to render them substantially light impenetrable. Levels of dye or pigment incorporation can be chosen to retain the light transmission characteristics in the thinner regions of the supports—e.g., in the microcell bottom wall region—while rendering the supports relatively less light penetrable in thicker region—e.g., in the lateral wall regions between adjacent microcells. The supports can contain neutral colorant or colorant combinations. Alternatively, the supports can contain radiation absorbing materials which are selective to a single region of the electromagnetic spectrum—e.g., blue dyes. The supports can contain materials which alter radiation transmission qualities, but are not visible, such as ultraviolet absorbers. Where two supports are employed in combination, the light transmission, absorption and reflection qualities of the two supports can be the same or different, depending upon the intended application.

Where the supports are formed of conventional photographic support materials, they can be provided with reflective and absorbing materials by techniques well known by those skilled in the art, such techniques being adequately illustrated in the various patents cited above in relation to support materials. In addition, reflective and absorbing materials can be employed of varied types conventionally incorporated directly in radiation-sensitive materials, particularly in second supports formed of vehicle and/or binder materials or using photoresists or dichromated gelatin. The incorporation of pigments of high reflection index in vehicle materials is illustrated, for example, by Marriage U.K. Pat. No. 504,283 and Yutzy et al U.K. Pat. No. 760,775. Absorbing materials incorporated in vehicle materials are illustrated by Jelley et al U.S. Pat. No. 2,697,037; colloidal silver (e.g., Carey Lea Silver widely used as a filter for blue light); super fine silver halide used to improve sharpness, as illustrated by U.K. Pat. No. 1,342,687; finely divided carbon used to improve sharpness or for antihalation protection, as illustrated by Simmons U.S. Pat. No. 2,327,828; filter and antihalation dyes, such as the pyrazolone oxonol dyes of Gaspar U.S. Pat. No. 2,274,782, the solubilized diaryl azo dyes of Van Campen U.S. Pat. No. 2,956,879, the solubilized styryl and butadienyl dyes of Heseltine et al U.S. Pat. Nos. 3,423,207 and 3,384,487, the merocyanine dyes of Silberstein et al U.S. Pat. No. 2,527,583, the merocyanine and oxonol dyes of Oliver U.S. Pat. Nos. 3,486,897 and 3,652,284 and Oliver et al U.S. Pat. No. 3,718,472 and the enamino hemioxonol dyes of Brooker et al U.S. Pat. No. 3,976,661 and ultraviolet absorbers, such as the cyanomethyl sulfone-derived merocyanines of Oliver U.S. Pat. No. 3,723,154, the thiazolidones, benzotriazoles and thiazolothiazoles of Sawdey U.S. Pat. Nos. 2,739,888, 3,253,921 and 3,250,617 and Sawdey et al U.S. Pat. No. 2,739,971, the triazoles of Heller et al U.S. Pat. No. 3,004,896 and the hemioxonols of Wahl et al U.S. Pat. No. 3,125,597 and Weber et al U.S. Pat. No. 4,045,229. The dyes and ultraviolet absorbers can be mordanted, as illustrated by Jones et al U.S. Pat. No.

3,282,699 and Heseltine et al U.S. Pat. Nos. 3,455,693 and 3,438,779.

One preferred technique according to this invention for preparing microcell containing supports is to expose a photographic element having a transparent support in a regular hexagonal pattern, such as illustrated in FIG. 1A. In a preferred form the photographic element is negative-working and exposure corresponds to the areas intended to be subtended by the microcell areas while the areas intended to be subtended by the lateral walls are not exposed. By conventional photographic techniques a pattern is formed in the element in which the areas to be subtended by the microcells are of a substantially uniform maximum density while the areas intended to be subtended by the lateral walls are of a substantially uniform minimum density.

The photographic element bearing the image pattern is next coated with a radiation-sensitive composition capable of forming the lateral walls of the support and thereby defining the side walls of the microcells. In a preferred form the radiation-sensitive coating is a negative-working photoresist or dichromated gelatin coating. The coating can be on the surface of the photographic element bearing the image pattern or on the opposite surface—e.g., for a silver halide photographic element, the photoresist or dichromated gelatin can be coated on the support or emulsion side of the element. The photoresist or dichromated gelatin coating is next exposed through the pattern in the photographic element, so that the areas corresponding to the intended lateral walls are exposed. This results in hardening to form the lateral wall structure and allowing the unexposed material to be removed according to conventional procedures well known to those skilled in the art. For instance, these procedures are fully described in the patents cited above in connection with the description of photoresist and dichromated gelatin support materials.

The image pattern is preferably removed before the element is subsequently put to use. For example, where a silver halide photographic element is exposed and processed to form a silver image pattern, the silver can be bleached by conventional photographic techniques after the microcell structure is formed by the radiation-sensitive material.

If a positive-working photoresist is employed, it is initially in a hardened form, but is rendered selectively removable in areas which receive exposure. Accordingly, with a positive-working photoresist or other radiation-sensitive material the sense of the exposure pattern is reversed. If an exposure blocking pattern is present in or on the support corresponding to the lateral walls forming the microcells, this pattern need not be removed for many applications and can even take the place of increasing the optical density of the lateral walls forming the microcells in many instances. Instead of coating the radiation-sensitive material onto a support bearing an image pattern, such as an image-bearing photographic element, the radiation-sensitive material can be coated onto any conventional support and imagewise exposed directly rather than through an image pattern. It is, of course, a simple matter to draw the desired microcell pattern on an enlarged or macro-scale and then to photoreduce the pattern to the desired scale of the microcells for purposes of exposing the photoresist.

Another technique which can be used to form the microcells in the support is to form a plastic deformable material as a planar element or as a coating on a relatively nondeformable support element and then to form the microcells in the relatively deformable material by embossing. An embossing tool is employed which contains projections corresponding to the desired shape of the microcells. The projections can be formed on an initially plane surface by conventional techniques, such as coating the surface with a photoresist, imagewise exposing in a desired pattern and removing the photoresist in the areas corresponding to the spaces between the intended projections (which also correspond to the configuration of the lateral walls to be formed in the support). The areas of the embossing tool surface which are not protected by photoresist are then etched to leave the projections. Upon removal of the photoresist overlying the projections and any desired cleaning step, such as washing with a mild acid, base or other solvent, the embossing tool is ready for use. In a preferred form the embossing tool is formed of a metal, such as copper, and is given a metal coating, such as by vacuum vapor depositing chromium or silver. The metal coating results in smoother walls being formed during embossing.

The foregoing techniques are well suited to forming transparent microcell containing supports, a variety of transparent materials being available satisfying the requirements for use. Where a white support is desired, white materials can be employed or the transparent materials can be loaded with white pigment, such as titania, baryta and the like. Any of the whitening materials employed in conjunction with conventional reflective photographic supports can be employed. Pigments to impart colors other than white to the support can, of course, also be employed, if desired. Pigments are particularly well suited to forming opaque supports which are white or colored. Where it is desired that the support be transparent, but tinted, dyes of a conventional nature are preferably incorporated in the support forming materials. For example, in one form of the support described above the support is preferably yellow to absorb blue light while transmitting red and green.

In various forms of the supports described above the portion of the support forming the bottom walls of at least one set of microcells, generally all of the microcells, is transparent, and the portion of the support forming the lateral walls is either opaque or dyed to intercept light transmission therethrough. As has been discussed above, one technique for achieving this result is to employ different support materials to form the bottom and lateral walls of the supports.

A preferred technique for achieving dyed lateral walls and transparent bottom walls in a support formed of a single material is as follows: A transparent film is employed which is initially unembossed and relatively nondeformable with an embossing tool. Any of the transparent film-forming materials more specifically described above and known to be useful in forming conventional photographic film supports, such as cellulose nitrate or ester, polyethylene, polystyrene, poly(ethylene terephthalate) and similar polymeric films, can be employed. One or a combination of dyes capable of imparting the desired color to the lateral walls to be formed is dissolved in a solution capable of softening the transparent film. The solution can be a conventional plasticizing solution for the film. As the plasticizing solution migrates into the film from one major surface, it carries the dye along with it, so that the film is both dyed and softened along one major surface. Thereafter the film can be embossed on its softened and therefore relatively deformable surface. This produces microcells in the film support which have dyed lateral walls and transparent bottom walls.

The membranes positioned to close the microcells of the support are comprised of any material which can be selectively destroyed or removed over an area corresponding to that subtended by an underlying microcell (or, in some instances, an underlying cluster of microcells). In general the membranes can be most conveniently formed of organic film-forming polymers. The membranes can be identical in composition to conventional photographic film supports. Typical film-forming polymers useful in forming membranes are cellulose nitrate and cellulose esters, such as cellulose triacetate and diacetate, polyamides, homo- and co-polymers of styrene, acrylates and methacrylates, vinyl chloride, poly(vinyl acetal), and olefins, such as ethylene and propylene. Where the membranes are intended to be thermally destroyed, as by impingement with a laser beam, the less thermally stable film-forming polymers used in preparing photographic film supports are preferred. Merely heating the membranes to their thermal decomposition temperature is not, however, the only way of destroying the membranes. Cellulose coatings and particularly cellulose nitrate can be selectively destroyed in exposed areas by alpha particles and similar fusion fragments, as taught by Sherwood U.S. Pat. No. 3,501,636, here incorporated by reference. It is also specifically contemplated to employ electron beams to destroy the membrane in selected areas.

Generally any conventional combination of materials known to be useful when related in an interlaid pattern can be selected for incorporation in the separate sets of microcells. Virtually any known additive primary dye or pigment can, if desired, be selected for use in the multicolor filters described above. Further, the additive primary color can be imparted by blending two subtractive primary dyes or pigments. Additive and subtractive primary dyes and pigments mentioned in the *Color Index*, Volumes I and II, 2nd Edition, are generally useful in the practice of at least one form of the present invention.

For photographic applications it has been recognized that the incorporation of radiation-sensitive and/or imaging forming materials in microcells has the effect of limiting lateral image spreading. Lateral image spreading has been observed in a wide variety of conventional photographic elements. Lateral image spread can be a product of optical phenomena, such as reflection or scattering of exposing radiation; diffusion phenomena, such as lateral diffusion of radiation-sensitive and/or imaging materials in the radiation-sensitive and/or imaging layers of the photographic elements; or, most commonly, a combination of both. Lateral image spreading is particularly common where the radiation-sensitive and/or other imaging materials are dispersed in a vehicle or binder intended to be penetrated by exposing radiation and/or processing fluids. While the present invention can be practiced with conventional radiation-sensitive and image-forming materials known to be useful in photography, it is appreciated that materials which exhibit visually detectable lateral image spreading are particularly benefited by incorporation into microcells according to this invention.

A variety of useful nonsilver imaging materials useful in the practice of this invention are disclosed by Kosar, *Light-Sensitive Systems: Chemistry and Application of Nonsilver Halide Photographic Processes*, John Wiley and Sons, 1965. Generally any imaging system capable of forming a multicolor image can be applied to the practice of this invention. It is specifically preferred to employ in the practice of this invention, radiation-sensitive silver halide and the image forming materials associated therewith in multicolor imaging. Exemplary materials are described in *Research Disclosure*, Vol. 176, December 1978, Item 17643, the disclosure of which is here incorporated by reference. Particularly pertinent are paragraphs I. Emulsion types, III. Chemical sensitization, IV. Spectral sensitization, VI. Antifoggants and stabilizers, IX. Vehicles, and X. Hardeners, which set out conventional features almost always present in preferred silver halide emulsions useful in the practice of this invention.

A variety of dye image transfer systems have been developed and can be employed in the practice of this invention. One approach is to employ ballasted dye-forming (chromogenic) or nondye-forming (nonchromogenic) couplers having a mobile dye attached at a coupling-off site. Upon coupling with an oxidized color developing agent, such as a para-phenylenediamine, the mobile dye is displaced so that it can transfer to a receiver. The use of such negative-working dye image providing compounds is illustrated by Whitmore et al U.S. Pat. No. 3,227,550, Whitmore U.S. Pat. No. 3,227,552 and Fujiwhara et al U.K. Pat. No. 1,445,797, the disclosures of which are here incorporated by reference.

In a preferred image transfer system employing as negative-working dye image providing compounds redox dye-releasers, a cross-oxidizing developing agent (electron transfer agent) develops silver halide and then cross-oxidizes with a compound containing a dye linked through an oxidizable sulfonamido group, such as a sulfonamidophenol, sulfonamidoaniline, sulfonamidoanilide, sulfonamidopyrazolobenzimidazole, sulfonamidoindole or sulfonamidopyrazole. Following cross-oxidation hydrolytic deamidation cleaves the mobile dye with the sulfonamido group attached. Such systems are illustrated by Fleckenstein U.S. Pat. Nos. 3,928,312 and 4,053,312, Fleckenstein et al U.S. Pat. No. 4,076,529, Melzer et al U.S. Pat. No. 4,110,113, Degauchi U.S. Pat. No. 4,199,892, Koyama et al U.S. Pat. No. 4,055,428, Vetter et al U.S. Pat. No. 4,198,235, and Kestner et al *Research Disclosure*, Vol. 151, November 1976, Item 15157. Also specifically contemplated are otherwise similar systems which employ an immobile, dye-releasing (a) hydroquinone, as illustrated by Gompf et al U.S. Pat. No. 3,698,897 and Anderson et al U.S. Pat. No. 3,725,062, (b) para-phenylenediamine, as illustrated by Whitmore et al Canadian Pat. No. 602,607, or (c) quaternary ammonium compound, as illustrated by Becker et al U.S. Pat. No. 3,728,113.

Another specifically contemplated dye image transfer system which employs negative-working dye image providing compounds reacts an oxidized electron transfer agent or, specifically, in certain forms, an oxidized para-phenylenediamine with a ballasted phenolic coupler having a dye attached through a sulfonamido linkage. Ring closure to form a phenazine releases mobile dye. Such an imaging approach is illustrated by Bloom et al U.S. Pat. Nos. 3,443,939 and 3,443,940.

In still another image transfer system employing negative-working dye image providing compounds, ballasted sulfonylamidrazones, sulfonylhydrazones or sulfonylcarbonylhydrazides can be reacted with oxidized para-phenylenediamine to release a mobile dye to be transferred, as illustrated by Puschel et al U.S. Pat. Nos. 3,628,952 and 3,844,785. In an additional negative-working system a hydrazide can be reacted with silver halide having a developable latent image site and thereafter decompose to release a mobile, transferable dye, as illustrated by Rogers U.S. Pat. No. 3,245,789, Kohara et al *Bulletin Chemical Society of Japan,* Vol. 43, pp. 2433–37, and Lestina et al *Research Disclosure,* Vol. 28, December 1974, Item 12832.

The foregoing image transfer systems all employ negative-working dye image providing compounds which are initially immobile and contain a preformed dye which is split off during imaging. The released dye is mobile and can be transferred to a receiver. Positive-working, initially immobile dye image providing compounds which split off mobile dyes are also known. For example, it is known that when silver halide is imagewise developed the residual silver ions associated with the undeveloped silver halide can react with a dye substituted ballasted thiazolidine to release a mobile dye imagewise, as illustrated by Cieciuch et al U.S. Pat. No. 3,719,489 and Rogers U.S. Pat. No. 3,443,941.

Preferred positive-working, initially immobile dye image providing compounds are those which release mobile dye by intramolecular nucleophilic displacement reactions. The compound in its initial form is hydrolyzed to its active form while silver halide development with an electron transfer agent is occurring. Cross-oxidation of the active dye-releasing compound by the oxidized electron transfer agent prevents intramolecular nucleophilic release of the dye moiety. Benzisoxazolone precursors of hydroxylamine dye-releasing compounds are illustrated by Hinshaw et al U.S. Pat. No. 4,199,354, and *Research Disclosure,* Vol. 144, April 1976, Item 14447. N-Hydroquinonyl carbamate dye-releasing compounds are illustrated by Fields et al U.S. Pat. No. 3,980,479. It is also known to employ an immobile reducing agent precursor (electron donor precursor) in combination with an immobile ballasted electron-accepting nucleophilic displacement (BEND) compound which, on reduction, anchimerically displaces a diffusible dye. Hydrolysis of the electron donor precursor to its active form occurs simultaneously with silver halide development by an electron transfer agent. Cross-oxidation of the electron donor with the oxidized electron transfer agent prevents further reaction. Cross-oxidation of the BEND compound with the residual, unoxidized electron donor then occurs. Intramolecular nucleophilic displacement of mobile dye from the reduced BEND compound occurs as part of a ring closure reaction. An image transfer system of this type is illustrated by Chasman et al U.S. Pat. No. 4,139,379.

Other positive-working systems employing initially immobile, dye-releasing compounds are illustrated by Rogers U.S. Pat. No. 3,185,567 and U.K. Pat. Nos. 880,233 and '234.

A variety of positive-working, initially mobile dye image providing compounds can be imagewise immobilized by reduction of developable silver halide directly or indirectly through an electron transfer agent. Systems which employ mobile dye developers, including shifted dye developers, are illustrated by Rogers U.S. Pat. Nos. 2,774,668 and 2,983,606, Idelson et al U.S. Pat. No. 3,307,947, Dershowitz et al U.S. Pat. No. 3,230,085, Cieciuch et al U.S. Pat. No. 3,579,334, Yutzy U.S. Pat. No. 2,756,142, Harbison Def. Pub. T889,017, and Bush et al U.S. Pat. No. 3,854,945. In a variant form a dye moiety can be attached to an initially mobile coupler. Oxidation of a para-phenylenediamine or hydroquinone developing agent can result in a reaction between the oxidized developing agent and the dye containing a coupler to form an immobile compound. Such systems are illustrated by Rogers U.S. Pat. Nos. 2,774,668 and 3,087,817, Greenhalgh et al U.K. Pat. Nos. 1,157,501-506, Puschel et al U.S. Pat. No. 3,844,785, Stewart et al U.S. Pat. No. 3,653,896, Gehin et al French Pat. No. 2,287,711, and *Research Disclosure,* Vol. 145, May 1976, Item 14521.

Other image transfer systems employing positive-working dye image providing compounds are known in which varied immobilization or transfer techniques are employed. For example, a mobile developer-mordant can be imagewise immobilized by development of silver halide to imagewise immobilize an initially mobile dye, as illustrated by Haas U.S. Pat. No. 3,729,314. Silver halide development with an electron transfer agent can produce a free radical intermediate which causes an initially mobile dye to polymerize in an imagewise manner, as illustrated by Pelz et al U.S. Pat. No. 3,585,030 and Oster U.S. Pat. No. 3,019,104. Tanning development of a gelatino-silver halide emulsion can render the gelatin impermeable to mobile dye and thereby imagewise restrain transfer of mobile dye as illustrated by Land U.S. Pat. No. 2,543,181. Also gas bubbles generated by silver halide development can be used effectively to restrain mobile dye transfer, as illustrated by Rogers U.S. Pat. No. 2,774,668. Electron transfer agent not exhausted by silver halide development can be transferred to a receiver to imagewise bleach a polymeric dye to a leuco form, as illustrated by Rogers U.S. Pat. No. 3,015,561.

A number of image transfer systems employing positive-working dye image providing compounds are known in which dyes are not initially present, but are formed by reactions occurring in the photographic element or receiver following exposure. For example, mobile coupler and color developing agent can be imagewise reacted as a function of silver halide development to produce an immobile dye while residual developing agent and coupler are transferred to the receiver and the developing agent is oxidized to form on coupling a transferred immobile dye image, as illustrated by Yutzy U.S. Pat. No. 2,756,142, Greenhalgh et al U.K. Pat. Nos. 1,157,501-'506, and Land U.S. Pat. Nos. 2,559,643, 2,647,049, 2,661,293, 2,698,244, and 2,698,798. In a variant form of this system the coupler can be reacted with a solubilized diazonium salt (or azosulfone precursor) to form a diffusible azo dye before transfer, as illustrated by Viro et al U.S. Pat. No. 3,837,852. In another variant form a single, initially mobile coupler-developer compound can participate in intermolecular self-coupling at the receiver to form an immobile dye image, as illustrated by Simon U.S. Pat. No. 3,537,850 and Yoshiniobu U.S. Pat. No. 3,865,593. In still another variant form a mobile amidrazone is present with the mobile coupler and reacts with it at the receiver to form an immobile dye image, as illustrated by Janssens et al U.S. Pat. No. 3,939,035. Instead of using a mobile coupler, a mobile leuco dye can be employed. The leuco dye reacts with oxidized electron transfer agent to form an immobile product, while unreacted leuco dye is transferred to the receiver and oxidized to form a dye image, as illustrated by Lestina et al U.S. Pat. Nos. 3,880,658, 3,935,262, and 3,935,263, Cohler et al U.S. Pat. No. 2,892,710, Corley et al U.S. Pat. No. 2,992,105, and Rogers U.S. Pat. Nos. 2,909,430 and 3,065,074. Mobile quinone heterocyclammonium salts can be immobilized as a function of silver halide development and residually transferred to a receiver where conversion to a cyanine or merocyanine dye occurs, as illustrated by Bloom U.S. Pat. Nos. 3,537,851 and '852.

Image transfer systems employing negative-working dye image providing compounds are also known in which dyes are not initially present, but are formed by reactions occurring in the photographic element or receiver following exposure. For example, a ballasted coupler can react with color developing agent to form a mobile dye, as illustrated by Whitmore et al U.S. Pat. No. 3,227,550, Whitmore U.S. Pat. No. 3,227,552, Bush et al U.S. Pat. No. 3,791,827, and Viro et al U.S. Pat. No. 4,036,643. An immobile compound containing a coupler can react with oxidized para-phenylenediamine to release a mobile coupler which can react with additional oxidized para-phenylenediamine before, during or after release to form a mobile dye, as illustrated by Figueras et al U.S. Pat. No. 3,734,726 and Janssens et al German OLS No. 2,317,134. In another form a ballasted amidrazone reacts with an electron transfer agent as a function of silver halide development to release a mobile amidrazone which reacts with a coupler to form a dye at the receiver, as illustrated by Ohyama et al U.S. Pat. No. 3,933,493.

Where oxidation at the receiver is relied upon to produce an immobile transferred dye image, the receiver can contain as a continuous layer or in microvessels an oxidizing agent. Exemplary useful oxidants for such applications include borates, persulfates, ferricyanides, periodates, perchlorates, triiodides, permanganates, dichromates, manganese dioxide, silver halides, benzoquinones, naphthoquinones, disulfides, nitroxyl compounds, heavy metal oxidants, heavy metal oxidant chelates, N-bromo-succinimides, nitroso compounds, ether peroxides, and the like. The oxidants are preferably chosen from among those of sufficient molecular bulk to be substantially immobile and thereby confined during processing to the receiver. Exemplary preferred immobile oxidants are the immobile nitroxyl compounds disclosed by Ciurca et al U.S. Pat. No. 4,088,488. Other useful immobile oxidants can be chosen from among those described in the patents cited above disclosing oxidation at a receiver to form a dye. Where oxidation does not in itself result in the formation of an immobile dye, as where the oxidant's primary function is to form a dye, rather than immobilization, a combination of oxidant and a mordant or other immobilizing agent can be present in the dye image providing layer.

Mordants employed to immobilize dyes in the practice of this invention can be chosen from a variety of known mordants. Examples of useful mordants include the following: Sprague et al U.S. Pat. No. 2,548,564, Weyerts U.S. Pat. No. 2,548,575, Carroll et al U.S. Pat. No. 2,675,316, Yutzy et al U.S. Pat. No. 2,713,305, Saunders et al U.S. Pat. No. 2,756,149, Reynolds et al U.S. Pat. No. 2,768,078, Gray et al U.S. Pat. No. 2,839,401, Minsk U.S. Pat. Nos. 2,882,156 and 2,945,006, Whitmore et al U.S. Pat. No. 2,940,849, Condax U.S. Pat. No. 2,952,566, Mader et al U.S. Pat. No. 3,016,305, Minsk et al U.S. Pat. Nos. 3,048,487 and 3,184,309, Bush U.S. Pat. No. 3,271,147, Whitmore U.S. Pat. No. 3,271,148, Jones et al U.S. Pat. No. 3,282,699, Wolf et al U.S. Pat. No. 3,408,193, Cohen et al U.S. Pat. Nos. 3,488,706, 3,557,066, 3,625,694, 3,709,690, 3,758,445, 3,788,855, 3,898,088, and 3,944,424, Cohen U.S. Pat. No. 3,639,357, Taylor U.S. Pat. No. 3,770,439, Campbell et al U.S. Pat. No. 3,958,995, and Ponticello et al *Research Disclosure*, Vol. 120, April 1974, Item 12045. Preferred mordants for forming filter layers are more specifically disclosed by *Research Disclosure*, Vol. 167, March 1978, Item 16725.

The disclosures of the patents and publications cited above as illustrating image transfer systems employing positive and negative-working dye image providing compounds are here incorporated by reference. Any one of these systems for forming transferred dye images can be readily employed in the practice of this invention. Other features of useful dye image transfer systems are set forth in Paragraph XXIII, Item 17643, *Research Disclosure*, cited above and here specifically incorporated by reference.

The use of silver ion complex precipitating agents is disclosed in connection with various preferred forms of multicolor image transfer element 600. A wide variety of nuclei or silver precipitating agents can be utilized in the reception layers used in silver halide solvent transfer processes. Such nuclei are incorporated into conventional photographic organic hydrophilic colloid layers such as gelatin and polyvinyl alcohol layers and include such physical nuclei or chemical precipitants as (a) heavy metals, especially in colloidal form and salts of these metals, (b) salts, the anions of which form silver salts less soluble than the silver halide of the photographic emulsion to be processed, and (c) nondiffusible polymeric materials with functional groups capable of combining with and insolubilizing silver ions.

Typical useful silver precipitating agents include sulfides, selenides, polysulfides, polyselenides, thiourea and its derivatives, mercaptans, stannous halides, silver, gold, platinum, palladium, mercury, colloidal silver, aminoguanidine sulfate, aminoguanidine carbonate, arsenous oxide, sodium stannite, substituted hydrazines, xanthates, and the like. Poly(vinyl mercaptoacetate) is an example of a suitable nondiffusing polymeric silver precipitate. Heavy metal sulfides such as lead, silver, zinc, aluminum, cadmium, and bismuth sulfides are useful, particularly the sulfides of lead and zinc alone or in an admixture of complex salts of these with thioacetamide, dithio-oxamide, or dithiobiuret. The heavy metals and the noble metals, particularly in colloidal form, are especially effective. Other silver precipitating agents will occur to those skilled in the present art.

Useful oxidized developing agent scavengers include ballasted or otherwise nondiffusing (immobile) antioxidants, as illustrated by Weissberger et al U.S. Pat. No. 2,336,327, Loria et al U.S. Pat. No. 2,728,659, Vittum et al U.S. Pat. No. 2,360,290, Jelley et al U.S. Pat. No. 2,403,721, and Thirtle et al U.S. Pat. No. 2,701,197. To avoid autooxidation the scavengers can be employed in combination with other antioxidants, as illustrated by Knechel et al U.S. Pat. No. 3,700,453.

Although the foregoing description is directed to certain preferred embodiments of this invention, it is appreciated that a variety of modifications can be undertaken. In one form of the membrane described above it is contemplated to incorporate a dye in the membrane to increase its heat absorption characteristics. This offers the advantage of rendering the membrane capable of adsorbing more energy upon laser addressing and thereby making more efficient use of the laser beam employed for opening the microcells. On the other hand, remnants of the membrane which are not thermally destroyed in opening the microcells can impart coloration to the support which may be objectionable for certain applications. Therefore it is specifically contemplated to incorporate in the membrane a bleachable dye. For example, a heat and/or light bleachable dye can be incorporated in the membrane. This will permit the membrane to more readily adsorb light during laser addressing, but permits any remnants of the membrane remaining in the completed product to be converted to a form exhibiting little or no coloration. Both heat and light bleachable dyes are well known in the art, as illustrated by Sturmer U.S. Pat. Nos. 3,984,248, 3,988,154, and 3,988,156, Heseltine et al U.S. Pat. No. Re. 29,168, Krueger U.S. Pat. No. 4,111,699, and Wise et al U.S. Pat. No. 3,769,019.

When the membrane is located on the support, in most instances there is sufficient adhesion to hold the membrane securely in position. Nevertheless, it is not necessary to rely solely on adhesion to retain the position of the membrane. It is specifically contemplated to place the membrane on the support in an atmosphere containing a gas more membrane-permeable than air. For example, the unfilled microcells can be covered by the membrane in a helium atmosphere. Upon standing in air the helium will slowly diffuse through the membrane into the atmosphere, but air, having a lower rate of permeation of the membrane, will not diffuse through the membrane sufficiently to replace the helium thus escaping. The result is that a pressure below atmospheric will develop within the microcells. This pressure differential serves to hold the membrane in position closing the microcells. Other techniques of holding the membrane in position on the support can be employed also in combination with those techniques described above or alone.

In most instances the membrane remains flexible as positioned on the support. If desired, the membrane can be treated once positioned on the support to increase its rigidity and strength. The exact treatment chosen will depend upon the specific composition of the membrane, but, in general, the membranes are formed of polymeric materials which can be increased in rigidity and strength by cross-linking. Effective cross-linking agents can be chosen from among those generally known in the art, including photographic hardeners, such as those disclosed in *Research Disclosure*, Vol. 176, December 1978, Item 17643. For cellulose and cellulose derivative membranes preferred cross-linking agents are epoxides, as illustrated by Allen et al U.S. Pat. No. 3,047,394, Burness U.S. Pat. No. 3,189,459, and Birr German Pat. No. 1,085,663. A particularly effective epoxide cross-linking agent is 1,4-butanediol diglycidyl ether, available under the trademark Acryldite.

In copending, commonly assigned patent application Blazey et al U.S. Ser. No. 193,065, filed Oct. 2, 1980, now U.S. Pat. No. 4,307,165, titled PLURAL IMAGING COMPONENT MICROCELLULAR ARRAYS, PROCESSES FOR THEIR FABRICATION, AND ELECTROGRAPHIC COMPOSITIONS, here incorporated by reference, there are disclosed microcellular supports formed wholly or partially of a photoconductor. The photoconductive support is first electrostatically charged in a nonuniform manner. Thereafter, laser addressing can be used to remove selectively electrostatic charge from selected microcells. By constituting one or a combination of dye, pigment, and silver halide as an electrographic imaging composition it is possible to introduce these materials selectively into the microcells retaining the initial electrostatic charge or the microcells from which the initial electrostatic charge was removed by laser addressing.

In one form of the present invention either before or after (but preferably after) a membrane is positioned to close the microcells it is specifically contemplated to charge electrostatically in a non-imagewise manner a microcellular photoconductive support. The process as disclosed by Blazey et al can now be performed. Laser addressing of selected microcells performs the usual function of dissipating the electrostatic charge associated with these microcells as well as thermally destroying the overlying membrane. Thereafter, by the use of a development electrode and manipulation of electric fields in a known manner, it is possible to introduce material selectively into the laser addressed microcells. Both the membrane overlying the remaining microcells and the electrostatic charge associated with these microcells work together to avoid inadvertent placement of the contents intended for the opened microcells in the remaining microcells. By repetitions of the process described above, it is possible to provide both membrane and electrostatic charge protection of microcells in producing three interlaid sets of microcells each containing differing fill contents. In second and third repetitions to fill second and third sets of microcells it should be noted that the exclusion effect whereby the contents of the microcells themselves exclude additional fill materials need not be relied upon, since a membrane can perform this function. Thus, the use of a membrane in conjunction with the process of Blazey et al according to this invention provides greater protection against fill materials being placed in microcells other than those specifically intended to receive these materials.

A photoconductive microcellular support can also be used to advantage where a membrane is alone responsible for directing fill materials to an appropriate set of microcells. To illustrate such an application a membrane is positioned to close the microcells and the photoconductive microcellular support is electrostatically charged. Thereafter one set of microcells can be addressed with a laser through the membrane to dissipate the electrostatic charge therefrom. However, in this instance the laser beam is not of sufficient intensity to destroy the membrane. Electrostatic toning can then be undertaken using any convenient conventional toning material. In one preferred form this results in electrostatic toner particles being supported on the membrane and overlying just those microcells which were laser addressed. The inverse relationship is, of course, possible.) The toner particles, because of their greater light absorption than the membrane itself, can be used to absorb laser energy, thereby accelerating thermal destruction of the membrane overlying microcells during a second laser address sequence. Instead of using a laser for selectively destroying the membrane, a uniform light source can be directed to the entire membrane covered support. The differential in heating in areas containing the toner particles and the remaining membrane areas can then be relied upon to open selectively the microcell set originally addressed. By restricting the placement of the toner particles to the center of each underlying microcell—that is, to a location laterally displaced from the microcell walls—it is possible to minimize any risk of inadvertently removing membrane from a microcell adjacent to the microcell which is intended to be opened.

The invention can be more specifically appreciated by reference to the following illustrative examples:

EXAMPLE 1

A pattern of hexagons 20 microns in width and approximately 10 microns high was formed on a copper plate by etching. Using the etched plate having hexagon projections, dichloromethane and ethanol (80:20 volume ratio) solvent containing 10 grams per 100 ml of Genacryl Orange-R, a yellow azo dye, was placed in contact with a cellulose acetate photographic film support for six seconds. Hexagonal microcells were embossed in the softened support separated by 2 micron lateral walls, as measured at the surface of the support. The yellow dye was absorbed in the cellulose acetate film support areas laterally surrounding, but not beneath, the microcells, giving a density to blue light.

A membrane was prepared by placing four drops of a commercial casting solution (Microfilm Solution ®, Sig Manufacturing Company, Montezuma, Iowa) onto the surface of water contained in a 30 by 35 cm tray. The casting solution contained cellulose nitrate as a film-forming polymer in an organic solvent comprised of aromatic hydrocarbon liquids (toluene and xylene) forming a major component and, as minor components, a mixture of lower molecular weight aliphatic alcohols, esters, and ketones (isopropyl alcohol, methyl ethyl ketone, 2-methyl propanol, isopropyl acetate, and methyl isobutyl ketone). The membrane was estimated to be in the range of from 0.2 to 0.6 micron in thickness.

A balsa wood frame forming a square opening 16 cm on an edge was placed upon the membrane to protect an area, and the membrane outside the frame was then collapsed by crushing it against the frame. The microcellular film support was coated with this membrane by immersing the film support in the water contained in the tray and then withdrawing it through the membrane with the microcells on the upper surface of the film support. The combined membrane and microcellular film support, with most microcells now containing water, was then dried, so that no water remained as a liquid within the microcells.

In order to increase the light absorbing capability of the membrane, the outer membrane surface was passed rapidly through the incandescent portion of a candle flame. Under microscopic examination, carbon could be seen on the outer surface of the membrane.

To open a first set of microcells, the microcellular film support with the membrane present providing a lightly carbon-coated outer surface was subjected to irradiation with a 647 nanometer laser beam in a pattern of laterally spaced lines. The beam power was in the 12 to 28 milliwatts per square centimeter range, and the beam cross-section was about 23 microns. Where the laser beam struck the membrane, the cells were uncovered in a single or double line, depending upon the power and placement of the beam.

To form materials for selectively filling microcells, three subtractive primary filter dye compositions were prepared as described below, identified as Yellow Dye Dispersion A, Magenta Dye Dispersion B, and Cyan Dye Dispersion C. The filter dye was in each instance chosen to be immobile, thereby avoiding transfer from the microcells once introduced.

To form the compositions actually used to fill each of three separate sets of microcells, two of the subtractive primary dye dispersions identified above were blended to form an additive primary filter material. An initially mobile and colorless subtractive dye-forming coupler was also blended with the two subtractive primary filter dyes. (The mobile couplers were, of course, immobile in the microcells, since mobility refers only to mobility upon contact with a photographic processing solution.)

Yellow Dye Dispersion A

A conventional aqueous-oil dispersion was prepared by homogenizing 40 grams yellow dye 3-{3-[α-(2,4-di-t-pentylphenoxy)acetamido]benzamido/-4-(4-methoxyphenylazo)-1-(2,4,6-trichlorophenyl)-2-pyrazolin-5-one, 120 grams auxiliary solvent 2-(2-butoxyethoxy)ethyl acetate and 27.2 grams gelatin diluted to 454 grams with water. Following homogenization, the dispersion was chill-set and noodle-washed to remove the auxiliary solvent.

Magenta Dye Dispersion B

A conventional aqueous-oil dispersion was prepared by homogenizing 40 grams magenta dye 3-{3-[α-(2,4-di-t-pentylphenoxy)acetamido]benzamido/-N-{4-[N-ethyl-N-(2-hydroxyethyl)amino]-2-tolylimino/-1-(2,4,6-trichlorophenyl)-2-pyrazolin-5-one, 80 grams permanent solvent 1,4-cyclohexylenedimethylbis(2-ethylhexanoate), 80 grams auxiliary solvent cyclohexanone, and 60 grams gelatin diluted to 1000 grams with water. Following homogenization, the dispersion was chill-set and noodle washed to remove the auxiliary solvent.

Cyan Dye Dispersion C

A conventional aqueous-oil dispersion was prepared by homogenizing 40 grams 2-[4-(2,4-di-t-pentylphenoxy)butylcarbamoyl]-N-{-4-[N-ethyl-N-(2-hydroxyethyl)amino]-2-toly/-1,4-naphthoquinone 4-monoimine, 80 grams permanent solvent 1,4-cyclohexylenedimethyl bis(2-ethylhexanoate), 80 grams auxiliary solvent cyclohexanone, and 60 grams gelatin diluted to 1000 grams with water. Following homogenization, the dispersion was chill-set and noodle-washed to remove the auxiliary solvent.

Dry Red Microsphere Dispersion Beads

First, 30 grams of yellow dye dispersion A and 30 grams of magenta dye dispersion B were melted together and diluted to 750 ml with water. Next, 3.0 grams cyan dye-forming coupler, 1-hydroxy-N-[2-(2-acetamido)phenethyl]-2-naphthamode, were dissolved in a minimum amount of ethyl alcohol and 5 percent sodium hydroxide and added to the solution of dispersions.

The resultant mixture was passed through a DeVilbiss ® (Model 65) ultrasonic nebulizer and into a heat jacketed drying column where the water was evaporated. The resultant dry red microsphere dispersion beads containing a cyan dye-forming coupler were collected and examined microscopically. They were approximately three microns and smaller in size.

Dry Green Microsphere Dispersion Beads

Yellow dye dispersion A, 20 grams, and cyan dispersion C, 40 grams, were melted together and diluted to 750 ml with water. Magenta dye-forming coupler, 3-(4-nitroanilino)-1-(2,4,6-trichlorophenyl)-2-pyrazolin-5-one, 3.0 grams, dissolved in a minimum amount of ethyl alcohol and 5 percent sodium hydroxide were added to the solution of dispersions. Following treatment in the nebulizer and drying column, dry green microsphere dispersion beads containing a yellow dye-forming coupler were obtained.

Dry Blue Microsphere Dispersion Beads

Magenta dye dispersion B, 30 grams, and cyan dye dispersion C, 30 grams, were melted together and diluted to 750 ml with water. Yellow dye-forming coupler, α-(4-carboxyphenoxy)-α-pivaloyl-2,4-dichloroacetanilide, 3.0 grams, dissolved in a minimum amount of ethyl alcohol and 5 percent sodium hydroxide were added to the solution of dispersions. Following treatment in the nebulizer and drying column, dry blue microsphere dispersion beads containing a yellow dye-forming coupler were obtained.

The microcellular film support with the membrane thereon destroyed in laterally spaced lines to open a first interlaid set of microcells was covered with the green microsphere dispersion beads. The dispersion beads were introduced into the opened microcells with a flexible rubber blade with excess beads being removed by brushing. Microscopic examination showed that microcells not struck by the laser beam still retained a membrane cover.

The microcellular film support with the membrane thereon was again scanned with the laser microbeam, but at an angle to the first linear scan. As before, the laser microbeam removed membrane in areas contacted, leaving a second, interlaid set of microcells uncovered. The newly uncovered microcells were filed with blue microsphere dispersion beads by the same procedure described above for filling with the green microsphere dispersion beads.

Thereafter, the remnants of the membrane were removed with an adhesive tape, opening the third interlaid set of microcells. The newly opened microcells were filled with the red microsphere dispersion beads. Excess fill material was then lifted from the microcellular face of the film support using adhesive tape.

The resulting three color microcellular filter array was placed in a high relative humidity environment overnight. The microcell contents became less scattering and appeared to be partially fused.

EXAMPLE 2

The procedure of Example 1 was repeated, except that the balsa wood frame was immersed in the water beneath the membrane and lifted upwardly to raise the membrane from the surface of the water. Thereafter the microcellular support element was gently laid on the membrane so that the membrane closed the microcells. The support element with the membrane in place was flexed so that the first major surface bearing the microcells was convex. Final setting of the membrane occurred with the support in this configuration.

EXAMPLE 3

The procedure of Example 1 was repeated, except that the composition of the casting solution was varied. The casting solution employed to form the membrane consisted of 8.5 grams of cellulose acetate and 42.0 grams of solvent. The solvent consisted of 80 ml of dichloromethane and 20 ml of methanol containing 0.6 g of Genacryl Blue dye to enhance the radiation adsorption of the membrane. No carbon was placed on the surface of the membrane.

EXAMPLE 4

The procedure of Example 1 was repeated, except that the composition of the casting solution was modified to include 1 g of Sudan Black B, wet with 10 drops of dichloromethane per 12 g of casting solution. No carbon was placed on the surface of the membrane.

In both Examples 3 and 4, the membranes adsorbed sufficient radiant energy from the laser to permit their local destruction to open selected microcells.

The invention has been described in detail with particular reference to preferred embodiments thereof, but it will be understood that variations and modifications can be effected within the spirit and scope of the invention.

What is claimed is:

1. In a process comprising
   forming in a support having first and second major surfaces a planar array of microcells opening toward the first major surface and
   selectively altering the contents of a first set of the microcells in relation to a second, interlaid set of the microcells,
   the improvement comprising selectively altering the contents of the microcells by
   positioning to overlie the first major surface, means for closing both the first and second sets of microcells and
   selectively removing the closing means from the first set of microcells to permit selectively altering the contents of the first set of microcells without concurrently altering the contents of the second set of microcells.

2. The improved process according to claim 1, wherein the microcells are from 1 to 200 microns in width.

3. The improved process according to claim 2, wherein the microcells are from 4 to 100 microns in width.

4. The improved process according to claim 1, wherein the means for closing comprises a membrane.

5. The improved process according to claim 4, wherein the membrane is comprised of an organic film-forming polymer.

6. The improved process according to claim 5, wherein adjacent microcells are separated by lateral walls formed by the support and the membrane is of a thickness in the range of from 5 to 50 percent the thickness of the lateral walls.

7. The improved process according to claim 6, wherein the membrane is from 0.2 to 1.0 micron in thickness.

8. The improved process according to claim 6, wherein a laser is employed to selectively remove the membrane from the first set of microcells.

9. The improved process according to claim 8, wherein a means is provided in contact with the membrane to increase its absorption of radiation.

10. In a process comprising
   forming in a support having first and second major surfaces a planar array of microcells opening toward the first major surface and
   selectively altering the contents of a first set of the microcells in relation to a second, interlaid set of the microcells,
   the improvement comprising selectively altering the contents of the microcells by positioning to overlie the first major surface, means for closing both the first and second sets of microcells, selectively removing the closing means from the first set of microcells, and altering the contents of the first set of microcells by selectively introducing a radiation-sensitive material, dye, or dye precursor therein.

11. The improved process according to claim 10, comprising removing the closing means from the first major surface after selective introduction into the first set of microcells and positioning a second closing means over the first major surface to close both the first and second sets of microcells.

12. The improved process according to claim 11, comprising selectively removing the closing means from the second set of microcells without concurrently altering the contents of the first set of microcells.

13. In a process comprising forming in a suppport having first and second major surfaces a planar array of microcells opening toward the first major surface and selectively altering the contents of a first set of the microcells in relation to a second, interlaid set of the microcells, the improvement comprising selectively altering the contents of the microcells by positioning to overlie the first major surface, means for closing both the first and second sets of microcells, selectively removing the closing means from the first set of microcells, and altering the contents of the first set of microcells by selectively removing a radiation-sensitive material, pigment, dye, or dye precursor therefrom while retaining the radiation-sensitive material, dye, or dye precursor in the second set of microcells.

14. In a process comprising forming a support having first and second major surfaces a planar array of microcells opening toward the first major surface and selectively altering the contents of a first set of the microcells in relation to a second, interlaid set of the microcells, the improvement comprising selectively altering the contents of the microcells by positioning to overlie the first major surface, means for closing both the first and second sets of microcells, selectively removing the closing means from the first set of microcells, and altering the contents of the first set of microcells by selectively introducing a radiation-sensitive material, dye, or dye precursor therein differing from a radiation-sensitive material, dye, or dye precursor in the second set of microcells.

15. In a process of forming a multicolor filter comprising forming in a support having first and second major surfaces a planar array of microcells opening toward the first major surface and introducing into an interlaid pattern of first, second, and third sets of microcells blue, green, and red filters, respectively, the improvement comprising positioning an organic film-forming membrane to close the microcells opening toward the first major surface, and laser addressing the membrane to open the first set of microcells, thereby permitting the contents of the first set of microcells to be altered without altering the contents of the second and third sets of microcells.

16. The improved process according to claim 15, comprising employing means for facilitating membrane absorption of laser radiation.

17. In a process comprising forming in a support having first and second major surfaces a planar array of microcells opening toward the first major surface and introducing into an interlaid pattern of first, second and third sets of microcells blue, green, and red filters, respectively, the improvemet comprising positioning an organic film-forming membrane to close the microcells opening toward the first major surface, laser addressing the membrane to open the first set of microcells, and aligning a radiation-sensitive imaging means adjacent the microcells containing the blue, green, and red filters.

18. The improved process according to claim 17, wherein the radiation-sensitive means is silver halide.

19. The improved process according to claim 18, comprising incorporating yellow, magenta, and cyan dyes or dye-forming precursors capable of shifting between mobility and immobility as a function of silver halide development into the microcells containing the blue, green, and red filters, respectively.

20. A process comprising casting an organic polymeric membrane of from 0.2 to 1.0 micron in thickness on the surface of a liquid, positioning the organic polymeric membrane on a support to overlie and close an array of microcells separated by lateral walls and opening toward one major surface of the support, the thickness of the lateral walls being at least twice the thickness of the membrane, laser addressing the membrane in a pattern corresponding to one set of microcells of the array, sufficient energy being transferred to the membrane in addressed areas to thermally destroy the membrane thereby opening the one set of microcells while leaving the membrane intact overlying and closing second and third interlaid sets of microcells of the array, introducing into the first set of microcells a first composition comprised of at least one of blue responsive silver halide, a blue filter material, and a yellow dye or dye precursor capable of shifting in mobility in response to silver halide development, laser addressing the membrane in a pattern including the second set of microcells and excluding the third set of microcells of the array, sufficient energy being transferred from the laser to the membrane in addressed areas to thermally destroy the membrane thereby opening the second set of microcells while leaving the membrane intact overlying and closing the third interlaid set of microcells of the array, introducing a second composition into the second set of microcells comprised of at least one of green responsive silver halide, a green filter material, and a magenta dye or dye precursor capable of shifting in mobility in response to silver halide development, removing the membrane from the third set of microcells, and introducing into the third set of microcells a third composition comprised of at least one of red responsive silver halide, a red filter material, and a cyan dye or dye precursor capable of shifting in mobility in response to silver halide development.

21. The combination comprising support means having first and second major surfaces and forming a planar array of microcells opening toward said first major surface and a destructable membrane overlying said first major surface, to close a plurality of the microcells of said planar array.

22. The combination according to claim 21, in which the microcells contain a thermally insulative material.

23. The combination according to claim 22, in which the microcells contain air.

24. The combination comprising support means having first and second major surfaces and forming a planar array of microcells opening toward said first major surface, a destructable membrane overlying said first major surface, to close a plurality of the microcells of said planar array, and at least a first set of the microcells containing radiation-sensitive imaging means, a dye, or a dye precursor.

25. The combination according to claim 24, in which a second, interlaid set of the microcells contain a different dye or dye precursor.

26. The combination according to claim 24, in which the first set of microcells contain radiation-sensitive imaging means.

27. The combination according to claim 26, in which the first set of microcells contain radiation-sensitive silver halide.

* * * * *